(12) United States Patent
Batra et al.

(10) Patent No.: US 11,115,811 B2
(45) Date of Patent: Sep. 7, 2021

(54) ADDRESS MANAGEMENT FOR BLUETOOTH DEVICES

(71) Applicant: QUALCOMM incorporated, San Diego, CA (US)

(72) Inventors: Mayank Batra, Cambridge (GB); Robin Heydon, Cambridge (GB); Ravi Shekhar, Thubarahalli (IN); Srivathsa Sridhara, Bhadravathi (IN); Dishant Srivastava, Bangalore (IN); Steven Singer, Cambridge (GB); Nicholas Jones, Cambridge (GB); Benjamin Campbell, Bury St Edmunds (GB); Richard Cardoe, Fen Drayton (GB); Laurence Richardson, Ely (GB)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/375,460

(22) Filed: Apr. 4, 2019

(65) Prior Publication Data

US 2020/0322788 A1    Oct. 8, 2020

(51) Int. Cl.
| | |
|---|---|
| *H04B 7/00* | (2006.01) |
| *H04W 8/26* | (2009.01) |
| *H04W 8/00* | (2009.01) |
| *H04W 8/24* | (2009.01) |
| *H04L 29/12* | (2006.01) |
| *H04W 76/14* | (2018.01) |

(Continued)

(52) U.S. Cl.
CPC .......... *H04W 8/26* (2013.01); *H04L 61/6081* (2013.01); *H04W 8/005* (2013.01); *H04W 8/24* (2013.01); *H04W 76/14* (2018.02); *H04W 4/80* (2018.02); *H04W 84/20* (2013.01)

(58) Field of Classification Search
CPC ....... H04W 8/26; H04W 76/14; H04W 8/005; H04W 8/24; H04W 4/80; H04W 84/20; H04L 61/6081
USPC ............................................... 455/41.1, 41.2
See application file for complete search history.

(56) References Cited

U.S. PATENT DOCUMENTS

| | | | | |
|---|---|---|---|---|
| 2015/0201440 A1* | 7/2015 | Gao | .......................... | H04B 5/02 455/41.2 |
| 2015/0359022 A1* | 12/2015 | Lau | ....................... | H04W 76/14 455/41.2 |

(Continued)

*Primary Examiner* — Kathy W Wang-Hurst
*Assistant Examiner* — Max Mathew
(74) *Attorney, Agent, or Firm* — Holland & Hart LLP

(57) ABSTRACT

Two devices (e.g., two wireless Bluetooth earbuds) may exchange device address information (e.g., Bluetooth address information) and may identify a primary address. When either of the devices connect to a source device (e.g., a phone), the primary address may be used by the connecting device such that the pair of devices appear as a single device (e.g., a Bluetooth-pairable device) to the source device, regardless of the device connecting to the source device as the primary device. The primary device may then send identity information (e.g., that has been exchanged with the secondary device) to the source device, such that the source device may connect to either of the two devices. Further, once a primary device connects to the source device, the primary device may transmit, to the secondary device, connection information such that the secondary device may connect to the source device and operate in the primary role.

20 Claims, 12 Drawing Sheets

(51) Int. Cl.
*H04W 84/20* (2009.01)
*H04W 4/80* (2018.01)

(56) References Cited

U.S. PATENT DOCUMENTS

| | | | |
|---|---|---|---|
| 2017/0280277 A1* | 9/2017 | Ge | H04W 48/16 |
| 2018/0063407 A1* | 3/2018 | Torikai | H04W 4/70 |
| 2018/0234358 A1* | 8/2018 | Jakubov | H04W 4/80 |
| 2018/0324553 A1* | 11/2018 | Zhou | H04W 4/024 |
| 2018/0352312 A1* | 12/2018 | Kwon | H04W 76/14 |
| 2019/0090189 A1* | 3/2019 | Story | H04W 76/28 |
| 2019/0103905 A1* | 4/2019 | Guruprasad | H04B 17/318 |
| 2019/0268666 A1* | 8/2019 | Lee | H04W 76/14 |
| 2019/0272498 A1* | 9/2019 | Swafford | A47F 5/0869 |
| 2019/0274024 A1* | 9/2019 | Sung | H04R 1/1091 |
| 2019/0274043 A1* | 9/2019 | Soni | G06F 21/34 |
| 2019/0274048 A1* | 9/2019 | Yamaki | G06K 7/1447 |
| 2019/0281155 A1* | 9/2019 | Pakidko | H04R 25/554 |
| 2019/0281437 A1* | 9/2019 | Watson | H04R 1/1016 |
| 2019/0281544 A1* | 9/2019 | Ko | H04L 63/101 |
| 2019/0289112 A1 | 9/2019 | Ozaki | |
| 2019/0289250 A1* | 9/2019 | Takagaki | H04W 92/08 |
| 2019/0289354 A1* | 9/2019 | Garcia | H04L 51/32 |
| 2019/0289442 A1* | 9/2019 | Kung | H04W 24/04 |
| 2019/0289649 A1* | 9/2019 | Zhang | H04L 5/0053 |
| 2019/0327684 A1* | 10/2019 | Wang | H03F 3/24 |
| 2020/0128394 A1* | 4/2020 | Han | H04W 4/80 |

\* cited by examiner

ADDRESS MANAGEMENT FOR BLUETOOTH DEVICES

BACKGROUND

The following relates generally to wireless communications, and more specifically to address management for Bluetooth devices.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point).

A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

SUMMARY

The described techniques relate to improved methods, systems, devices, and apparatuses that support address management for Bluetooth devices. A wireless device (e.g., a Bluetooth-enabled device having a primary Bluetooth-enabled component and a secondary Bluetooth-enabled component, for example, such as a pair of Bluetooth earbuds or a Bluetooth headset having two sub-components), may implement the techniques described herein for improved communications with a source device (e.g., such as a phone).

For example, a pair of Bluetooth devices may be in communication with a source device, such that one of the Bluetooth devices may operate in a primary role (e.g., establishes and maintains a connection with the source device) and the other Bluetooth device may operate in a secondary role (e.g., shadows or eavesdrops on the connection between the primary Bluetooth device and the source device). The techniques described herein may provide for improved selection or determination of primary and secondary roles amongst the Bluetooth devices, as well as improved address management in the topology of the three-device network.

Generally, two devices (e.g., two wireless Bluetooth earbuds) may exchange device address information (e.g., Bluetooth address information) and may identify a primary address. When either of the devices connect to a source device (e.g., a phone), the primary address may be used by the connecting device such that the pair of devices appear as a single device (e.g., a Bluetooth-pairable device) to the source device, regardless of the device connecting to the source device as the primary device. The primary device may then send identity information (e.g., that has been exchanged with the secondary device) to the source device, such that the source device may connect to either of the two devices. Further, once a primary device initially connects to the source device, the primary device may transmit, to the secondary device, source device connection information such that the secondary device may, in some cases, connect to the source device and operate in the primary role. The described techniques may further provide for various device role (e.g., primary role, secondary role) selection or switching scenarios (e.g., various use cases for how a device may select a primary or secondary role, use cases for how a device may switch roles, etc.).

A method of wireless communication at a first device is described. The method may include exchanging Bluetooth device address information with a second device based on a low energy connection between the first device and the second device, determining a role of the first device based on exchanging the Bluetooth device address information, identifying a primary address associated with the first device or the second device based on the exchanged Bluetooth device address information and the role of the first device, and pairing the first device with a third device or shadowing the second device based on the primary address.

An apparatus for wireless communication at a first device is described. The apparatus may include a processor, memory in electronic communication with the processor, and instructions stored in the memory. The instructions may be executable by the processor to cause the apparatus to exchange Bluetooth device address information with a second device based on a low energy connection between the first device and the second device, determine a role of the first device based on exchanging the Bluetooth device address information, identify a primary address associated with the first device or the second device based on the exchanged Bluetooth device address information and the role of the first device, and pair the first device with a third device or shadow the second device based on the primary address.

Another apparatus for wireless communication at a first device is described. The apparatus may include means for exchanging Bluetooth device address information with a second device based on a low energy connection between the first device and the second device, determining a role of the first device based on exchanging the Bluetooth device address information, identifying a primary address associated with the first device or the second device based on the exchanged Bluetooth device address information and the role of the first device, and pairing the first device with a third device or shadowing the second device based on the primary address.

A non-transitory computer-readable medium storing code for wireless communication at a first device is described. The code may include instructions executable by a processor to exchange Bluetooth device address information with a second device based on a low energy connection between the first device and the second device, determine a role of the first device based on exchanging the Bluetooth device address information, identify a primary address associated with the first device or the second device based on the exchanged Bluetooth device address information and the role of the first device, and pair the first device with a third device or shadow the second device based on the primary address.

In some examples of the method, apparatuses, and non-transitory computer-readable medium described herein, the pairing of the first device with the third device or the shadowing of the second device may be based on the role of the first device. Some examples of the method, apparatuses, and non-transitory computer-readable medium described herein may further include operations, features, means, or instructions for determining a second role of the first device subsequent to the pairing of the first device with the third device or the shadowing of the second device, and pairing the first device with the third device or shadowing the second device based on the primary address and the second role of the first device, the role of the first device different than the second role of the first device.

Some examples of the method, apparatuses, and non-transitory computer-readable medium described herein may further include operations, features, means, or instructions for determining an activity level of the first device, an activity level of the second device, or both, where the role of the first device may be determined based on the activity level of the first device, the activity level of the second device, or both.

Some examples of the method, apparatuses, and non-transitory computer-readable medium described herein may further include operations, features, means, or instructions for determining a link status between the first device and the third device, a link status between the second device and the third device, or both, where the role of the first device may be determined based on the link status between the first device and the third device, the link status between the second device and the third device, or both.

Some examples of the method, apparatuses, and non-transitory computer-readable medium described herein may further include operations, features, means, or instructions for identifying a user input selection of the first device, a user input selection of the second device, or both, where the role of the first device may be determined based on the user input selection of the first device, the user input selection of the second device, or both.

Some examples of the method, apparatuses, and non-transitory computer-readable medium described herein may further include operations, features, means, or instructions for determining a battery status of the first device, a battery status of the second device, or both, where the role of the first device may be determined based on the battery status of the first device, the battery status of the second device, or both.

Some examples of the method, apparatuses, and non-transitory computer-readable medium described herein may further include operations, features, means, or instructions for determining a previous role of the first device, a previous role of the second device, or both, where the role of the first device may be determined based on the previous role of the first device, the previous role of the second device, or both.

Some examples of the method, apparatuses, and non-transitory computer-readable medium described herein may further include operations, features, means, or instructions for identifying a range between the first device and the third device, a range between the second device and the third device, or both, where the role of the first device may be determined based on the range between the first device and the third device, the range between the second device and the third device, or both.

In some examples of the method, apparatuses, and non-transitory computer-readable medium described herein, the role of the first device includes a primary role and the primary address may be identified based on a Bluetooth address of the first device. Some examples of the method, apparatuses, and non-transitory computer-readable medium described herein may further include operations, features, means, or instructions for transmitting, to the third device, identity information based on the primary address, where the identity information includes the primary address. Some examples of the method, apparatuses, and non-transitory computer-readable medium described herein may further include operations, features, means, or instructions for transmitting, to the second device, a Bluetooth address of the third device, a link key to be used on a connection with the third device, an identity resolving key of the third device, a device root key of the first device, a long term key to be used on the connection with the third device, information to generate the long term key to be used on the connection with the third device, or any combination thereof.

In some examples of the method, apparatuses, and non-transitory computer-readable medium described herein, the role of the first device includes a secondary role and the primary address may be identified based on a Bluetooth address of the second device. Some examples of the method, apparatuses, and non-transitory computer-readable medium described herein may further include operations, features, means, or instructions for receiving, from the second device, a Bluetooth address of the third device, a link key to be used on a connection with the third device, an identity resolving key of the third device, a device root key of the first device, a long term key to be used on the connection with the third device, information to generate the long term key to be used on the connection with the third device, or any combination thereof. Some examples of the method, apparatuses, and non-transitory computer-readable medium described herein may further include operations, features, means, or instructions for determining a second role of the first device based on a status of the first device, where the second role of the first device includes a primary role, and pairing the first device with the third device based on the primary address and the Bluetooth address of the third device.

DETAILED DESCRIPTION

Figure 1:
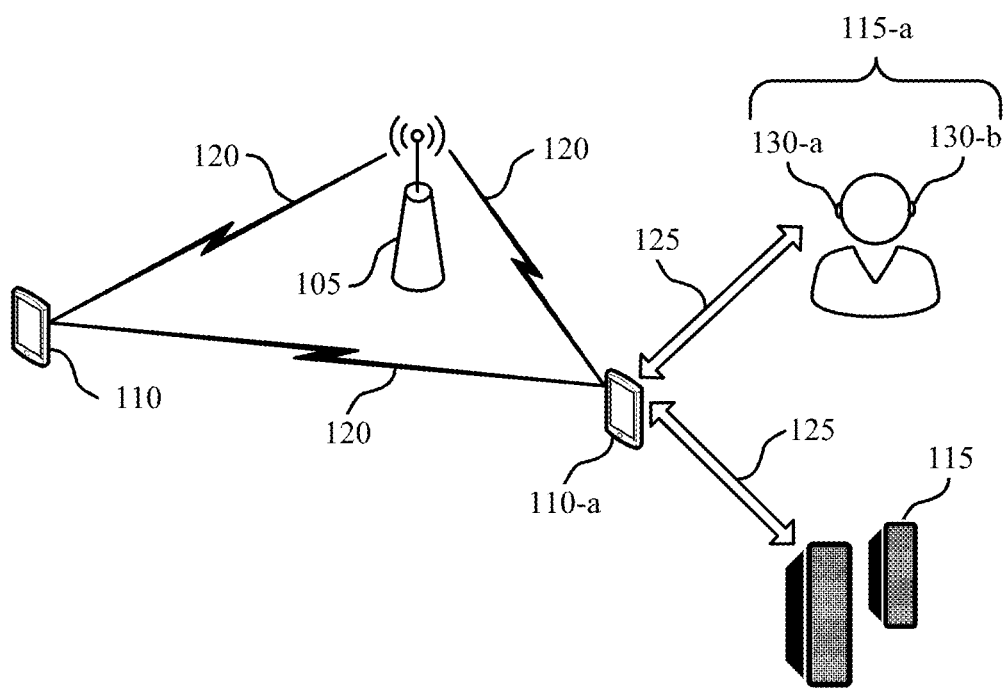
FIG. 1 illustrates an example of a system for wireless communications that supports address management for Bluetooth devices in accordance with aspects of the present disclosure.

Some wireless communications systems may be capable of supporting communication, and more specifically Bluetooth-enabled communication between devices (e.g., a smartphone and a Bluetooth-enabled device). In some examples, for Bluetooth-enabled devices, there may be a set of components where one component may be the primary component and the other component may be a secondary component. For example, for a pair of wireless Bluetooth-enabled earbuds, one earbud may be a primary earbud (e.g., a master device) and the other a secondary earbud (e.g., a slave device). The primary earbud may store connection information associated with a Bluetooth connection between another source device (e.g., a phone) and the pair of wireless Bluetooth earbuds. The secondary earbud may shadow or eavesdrop on the connection between the primary earbud and the source device.

To maintain or improve a quality of communications (e.g., voice and audio data transmissions) between the earbuds and the source device, the primary earbud may become the secondary earbud, or vice versa, based on one or more conditions (e.g., a quality of service (QoS) associated with one or both earbuds, a range from the source device associated with one or both earbuds, a power level associated with one or both earbuds). Because the primary earbud stores the connection information in some cases, it may be beneficial for the primary earbud to transfer or indicate connection information to the secondary earbud in an efficient manner, to sustain or enhance the quality of the communications minimal overhead, power consumption, latency, etc. Further, in cases where both earbuds are capable of providing a connection to the source device (e.g., in cases where either earbud is capable of operating as the primary earbud), both earbuds may appear individually, to the source device, as being selectable for a connection. In some cases, two separate addresses (e.g., one for each earbud), appearing for connection to a pair of earbuds may disorient or confuse, for example, a user of the source device (e.g., as the user wishing to connect to the pair of earbuds may not know which of the two addresses to select to establish a Bluetooth connection).

The techniques described herein may provide for improved selection or determination of primary and secondary roles amongst the Bluetooth devices, as well as improved address management in the topology of a multi-device network (e.g., a three-device network). For example, two devices (e.g., two earbuds) may initially connect to each other over a low energy (LE) connection. The devices may exchange Bluetooth device address information (e.g., each other's Bluetooth device address (BD_ADDRs), such as A1 and A2), and may identify a primary address (e.g., based on either A1 or A2, selected based on which device may initially operate as the primary device). As such, when either of the earbuds connect to the source device as the primary earbud, the primary address may be used by each such that the pair of earbuds may appear as a single Bluetooth-pairable device to the source device, regardless of the earbud connecting to the source device as the primary earbud.

The primary device (e.g., the primary earbud) may then send identity information to the source device. For example, the primary device may derive a long term key (LTK) for the LE transport and may send identity information, such as the primary address ($A_P$) and an identity resolving key associated with the primary address ($IRK_P$) to the source device, such that the source device may connect to either the primary device or the secondary device, which may be identifiable based on the primary address initially identified by the pair of Bluetooth-enabled devices.

Further, once a primary device (e.g., a primary earbud) initially connects to the source device (e.g., a phone) the primary device may transmit, to the secondary device (e.g., the secondary earbud) a Bluetooth address of the source device, a link key to be used on a connection with the source device, an identity resolving key of the source device, a device root key of the initial primary device, a long term key to be used on the connection with the source device, information to generate the long term key to be used on the connection with the source device, etc. As such, the secondary device may, in some cases, use this information to connect with the source device and operate in the primary role. Various conditions and scenarios for device selection of either a primary or secondary role, as well as various conditions and scenarios for device switching to and from either a primary or secondary role are described herein. Moreover, although this disclosure describes various examples—including but not limited to Bluetooth earbuds—other examples are contemplated and are applicable here. This disclosure is not limited to Bluetooth earbuds, Bluetooth devices, etc. but instead the concepts are applicable to various devices in various wireless communications scenarios.

Aspects of the disclosure are initially described in the context of a wireless communications system. Aspects of the disclosure are then illustrated by and described with reference to process flows and an example device state machine. Aspects of the disclosure are further illustrated by and described with reference to apparatus diagrams, system diagrams, and flowcharts that relate to address management for Bluetooth devices FIG. 1 illustrates an example of a wireless communications system 100 that supports address management for Bluetooth devices in accordance with aspects of the present disclosure. In some examples, the wireless communications system 100 may include or refer to a wireless personal area network (PAN), a wireless local area network (WLAN), a Wi-Fi network) configured in accordance with various aspects of the present disclosure. The wireless communications system 100 may include an access point (AP) 105, devices 110 (e.g., which may be referred to as source devices, master devices, etc.), and paired devices 115 (e.g., which may be referred to as sink devices, slave devices, etc.) implementing WLAN communications (e.g., Wi-Fi communications) and/or Bluetooth communications. For example, devices 110 may include cell phones, user equipment (UEs), wireless stations (STAs), mobile stations, personal digital assistant (PDAs), other handheld devices, netbooks, notebook computers, tablet computers, laptops, or some other suitable terminology. Paired devices 115 may include Bluetooth-enabled devices capable of pairing with other Bluetooth-enabled devices (e.g., such as devices 110), which may include wireless audio devices (e.g., headsets, earbuds, speakers, ear pieces, headphones), display devices (e.g., TVs, computer monitors), microphones, meters, valves, etc.

Bluetooth communications may refer to a short-range communication protocol and may be used to connect and exchange information between devices 110 and paired devices 115 (e.g., between mobile phones, computers, digital cameras, wireless headsets, speakers, keyboards, mice or other input peripherals, and similar devices). Bluetooth systems (e.g., aspects of wireless communications system 100) may be organized using a master-slave relationship employing a time-division duplex protocol having, for example, defined time slots of 625 mu seconds, in which transmission alternates between the master device (e.g., a device 110) and one or more slave devices (e.g., paired devices 115). In some examples, a device 110 may generally refer to a master device, and a paired device 115 may refer to a slave device in the wireless communications system 100. As such, in some examples, a device may be referred to as either a device 110 or a paired device 115 based on the Bluetooth role configuration of the device. That is, designation of a device as either a device 110 or a paired device 115 may not necessarily indicate a distinction in device capability, but rather may refer to or indicate roles held by the device in the wireless communications system 100. Generally, device 110 may refer to a wireless communication device capable of wirelessly exchanging data signals with another device (e.g., a paired device 115), and paired device 115 may refer to a device operating in a slave role, or to a short-range wireless communication device capable of exchanging data signals with the device 110 (e.g., using Bluetooth communication protocols).

A Bluetooth-enabled device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth-enabled devices may be offering. The Bluetooth specification defines device role pairs (e.g., roles for a device 110 and a paired device 115) that together form a single use case called a profile (e.g., for communications between the device 110 and the paired device 115). One example profile defined in the Bluetooth specification is the Handsfree Profile (HFP) for voice telephony, in which one device (e.g., a device 110) implements an Audio Gateway (AG) role and the other device (e.g., a paired device 115) implements a Handsfree (HF) device role. Another example is the Advanced Audio Distribution Profile (A2DP) for high-quality audio streaming, in which one device (e.g., device 110) implements an audio source device (SRC) role and another device (e.g., paired device 115) implements an audio sink device (SNK) role.

For a commercial Bluetooth-enabled device that implements one role in a profile to function properly, another device that implements the corresponding role may be present within the radio range of the first device. For example, in order for an HF device such as a Bluetooth headset to function according to the Handsfree Profile, a device implementing the AG role (e.g., a cell phone) may have to be present within radio range. Likewise, in order to stream high-quality mono or stereo audio according to the A2DP, a device implementing the SNK role (e.g., Bluetooth headphones or Bluetooth speakers) may have to be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement mechanisms, repeat mechanisms, sequence numbering, scheduling behavior, etc.). The Bluetooth protocol stack may be split in two parts: a controller stack including the timing critical radio interface, and a host stack handling high level data. The controller stack may be generally implemented in a low cost silicon device including a Bluetooth radio and a microprocessor. The controller stack may be responsible for setting up connection links 125 such as asynchronous connectionless (ACL) links, (or ACL connections), synchronous connection orientated (SCO) links (or SCO connections), extended synchronous connection-oriented (eSCO) links (or eSCO connections), other logical transport channel links, etc.

In some examples, the controller stack may implement link management protocol (LMP) functions, low energy link layer (LELL) functions, etc. The host stack may be generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some examples, the controller stack and the host stack may communicate via a host controller interface (HCI). In other cases, (e.g., for integrated devices such as Bluetooth headsets), the host stack and controller stack may be run on the same microprocessor to reduce mass production costs. For such host-less systems, the HCI may be optional, and may be implemented as an internal software interface.

A connection link 125 may be established between two Bluetooth-enabled devices (e.g., between a device 110 and a paired device 115) and may provide for communications or services (e.g., according to some Bluetooth profile). For example, a Bluetooth connection may be an eSCO connection for voice call (e.g., which may allow for retransmission), an ACL connection for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., paired device 115-a) are acknowledged, and may be retransmitted if not acknowledged during a retransmission window. In addition, audio may be streamed between the device 110-a and paired device 115-a using an ACL connection (A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (e.g., providing considerably reduced power consumption and cost while maintaining a similar communication range), human interface device profile (HID) (e.g., providing low latency links with low power requirements), etc.

A device may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 110 may support WLAN communications via AP 105 (e.g., over communication links 120). The AP 105 and the associated devices 110 may represent a basic service set (BSS) or an extended service set (ESS). The various devices 110 in the network may be able to communicate with one another through the AP 105. In some cases the AP 105 may be associated with a coverage area, which may represent a basic service area (BSA).

Devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communications system 100, and devices may communicate with each other via communication links 120 (e.g., Wi-Fi Direct connections, Wi-Fi Tunneled Direct Link Setup (TDLS) links, peer-to-peer communication links, other peer or group connections). AP 105 may be coupled to a network, such as the Internet, and may enable a device 110 to communicate via the network (or communicate with other devices 110 coupled to the AP 105). A device 110 may communicate with a network device bi-directionally. For example, in a WLAN, a device 110 may communicate with an associated AP 105 via downlink (e.g., the communication link from the AP 105 to the device 110) and uplink (e.g., the communication link from the device 110 to the AP 105).

In some examples, content, media, audio, etc. exchanged between a device 110 and a paired device 115 may originate from a WLAN. For example, in some examples, device 110 may receive audio from an AP 105 (e.g., via WLAN communications), and the device 110 may then relay or pass the audio to the paired device 115 (e.g., via Bluetooth communications). In some examples, certain types of Bluetooth communications (e.g., such as high quality or high definition (HD) Bluetooth) may require enhanced quality of service. For example, in some examples, delay-sensitive Bluetooth traffic may have higher priority than WLAN traffic.

For some Bluetooth-enabled devices, such as a paired device 115-a (e.g., a pair of Bluetooth earbuds or a Bluetooth headset) there may be a set of components where one component or device is the primary (e.g., master) and the other component or device a secondary (e.g., slave). For example, for a pair of wireless Bluetooth-enabled earbuds, one earbud (e.g., device 130-a) may be a primary earbud (e.g., master) and the other earbud (e.g., device 130-b) may be a secondary earbud (e.g., slave). In some cases, the primary earbud may store connection information associated with a Bluetooth connection (e.g., ACL connections, eSCO connections) between the device 110-a and the paired device 115-a (e.g., the paired device 115-a including device 130-a and device 130-b). In some cases, as part of establishing a Bluetooth connection (e.g., connection link 125), an ACL logical transport channel and one or more eSCO logical transport channels may be established. The ACL logical transport channel may support transport of control data between the device 110-a and the paired device 115-a, while the eSCO logical transport channel may support transport of voice and audio data between the device 110-a and the paired device 115-a.

In some examples, the primary component of the paired device 115-a may store connection information including ACL and eSCO logical transport channel parameters (e.g., an ACL LT_ADDR and an eSCO LT_ADDR) to manage transport of voice and audio data via the Bluetooth connection between the device 110-a and the paired device 115-a. For example, the device 110-a may have an ACL connection and one or more eSCO connections with the primary component of the paired device 115-a, while the secondary component of the paired device 115-a may obtain synchronization information of the ACL and eSCO connections from the primary component of the paired device 115-a. In this example, the secondary component of the paired device 115-a may monitor (also referred to herein as sniffing) both connections and then render the eSCO packet data. Because the primary component of the paired device 115-a may own the ACL and eSCO LT_ADDRs, only the primary component of the paired device 115-a may be allowed to transmit eSCO packets on the two connections (e.g., the ACL and eSCO connections). The primary component of the paired device 115-a is therefore transmitting its voice data (e.g., microphone data) on the eSCO connection.

Generally, a paired device 115-a (e.g., including device 130-a and device 130-b, such as pair of wireless earbuds) may connect with a device 110-a (e.g., such as a mobile phone). In some cases, this connection may refer to a secondary device (e.g., device 130-b) sniffing a connection between a primary device (e.g., device 130-a) and the device 110-a. Such a connection may provide for phone calls, audio streaming, etc. between the paired device 115-a and the device 110-a. In some cases, either component or device (e.g., earbud) of paired device 115-a may be capable of connecting to the device 110-a. That is, either of device 130-a and device 130-b may be capable of, and become, the primary device and establish a connection with the device 110-a (e.g., and the other device may take the role of the secondary device). As such, the device 130-a and device 130-b may communicate amongst themselves to set the topology of the three-device network (e.g., to determine primary/secondary roles, such that the secondary device may sniff the connection between the device 110-a and the primary device).

In some cases, it may be desirable for components or devices of a paired device 115 to switch roles (e.g., for device 130-a, or device 130-b, to switch from a primary device to a secondary device, or vice-versa). Further, each component or device of a paired device 115 may be associated with its own address (e.g., such that the components or devices of the paired device 115 may establish an initial connection, such that the components or devices of the paired device 115 may appear as devices for connection to a device 110-a, etc.). In some cases, as each of device 130-a and device 130-b may be capable of functioning as the primary device and establish a connection with the device 110-a, each of device 130-a and device 130-b may appear as selectable for connection to a user of a device 110-a. That is, in some cases, a device 110-a attempting to connect to a paired device 115-a may be presented with Bluetooth addresses for each of device 130-a and device 130-b, which may, for example, confuse or disorient a user. As such, it may further be desirable for the paired device 115-a to appear as a single device to the device 110-a (e.g., rather than as two separate devices 130-a and 130-b).

Accordingly, the techniques described herein may provide improvements in address management for Bluetooth devices. The techniques described herein may provide benefits and enhancements to the operation of a device 110 and a paired device 115. For example, the techniques described herein generally may provide for unambiguous Bluetooth device address management between components or devices of a paired device 115 (e.g., between device 130-a and device 130-b, such as Bluetooth wireless earbuds). The described techniques may provide a stable network to a user (e.g., to a device 110-a), and may provide for dynamic role selection or role switching between the components or devices of a paired device 115. Such may maintain or enhance a quality of voice and audio data transmission between the device 110-a and the paired device 115-a under a variety of conditions or scenarios arising in a three-device network between the device 110-a and the devices 130-a and 130-b (e.g., between the device 110-a and the paired device 115-a).

For example, each of device 130-a and device 130-b may have a BD_ADDR of their own. In some cases, these addresses may be used over the basic rate/extended data rate (BR/BDR) transport, and may also be the public address used over the LE transport. As discussed herein, the BD_ADDR of device 130-a and device 130-b may be referred to as A1 (e.g., address of some earbud 1) and A2 (e.g., address of some earbud 2), respectively. In some examples, when components (e.g., devices 130-a and 130-b) are manufactured, the components may be combined with other components, resulting in a paired device 115. For example, when earbuds are manufactured, they may have little or no prior knowledge or information of the earbud they will be combined with (e.g., earbuds may be manufactured on some large scale, and may be combined into a single package (e.g., and sold as a paired device 115-a to an end-user). That is, in some cases, devices 130 may be combined into a single package based on, for example, a right ear device 130-a and a left ear device 130-b, however devices 130 may have little to know other additional information of the other device 130 it has been paired with (e.g., devices 130 of a paired device 115-a may have no preestablished primary/secondary roles, may be unaware of each other's BD_ADDR, etc.).

When the devices 130 are powered for the first time (e.g., when the devices 130 are used by an end-user for the first time, such as taken out of packaging or a case and powered on), the devices 130 may connect to each other over the LE transport. For example, the devices 130 may perform a connectable undirected advertising procedure. During a connectable undirected advertising procedure, devices 130 may advertise (e.g., signal advertising packet data units, such as ADV_IND PDUs or ADV_EXT_IND/AUX_ADV_IND PDUs) with the advertiser address (AdvA) field set to either a non-resolvable private address (NRPA) or a resolvable private address (RPA) generated using any random identify resolving key (IRK). In the advertising data, the devices 130 may also include information regarding their appearance, the services that they support, manufacturer name, device name, their current state (e.g., could be in device discovery mode) etc. Devices 130 may also scan for such information during the connectable undirected advertising procedure. In some cases, device 130 may be preconfigured (e.g., or may pre-agree) such that the left device (e.g., a left earbud or device 130-b) scans and the right device (e.g., a right earbud or device 130-a) advertises, or vice-versa.

When an application running on the devices 130 receives the connectable undirected advertisement, the device 130 may look at the advertising data and decide to connect to the other device 130. The scanning device 130 may be able to determine from the advertising data that the remote device 130 is, for example, an earbud. But the advertising device 130 may obtain some more information before it can determine that the scanning device 130 is, for example, an earbud. For this purpose, the advertising device 130 may perform attribute protocol (ATT) operation(s) to understand that remote device 130 (e.g., the scanning device 130) is, for example, an earbud after connection establishment. The advertising device 130 may then decide to proceed. In some cases, the advertising device 130 may accept connection (e.g., by not dropping it) after discovering the initiator device's advertisements.

Once the LE connection has been created, the two devices 130 (e.g., device 130-a and device 130-b) may pair with each other using, for example, LE Secure Connections to generate a LTK and use cross-transport key derivation to derive the Link Key to be used on the BR/EDR transport. This LTK may be used to encrypt the LE connection between device 130-a and device 130-b when they connect with each other subsequently (e.g., as further described with reference to FIGS. 3-5). The Link Key may be stored in the 'security database' for both address A1 and A2. Since later, device 130-a and device 130-b may connect to each other using either address (e.g., as further described with reference to FIG. 2). Device 130-a and device 130-b may then exchange their BD_ADDRs (e.g., A1 and A2). Next, device 130-a and device 130-b may decide which one of the two will connect to the device 110-a (e.g., the phone) and whose BD_ADDR will be exposed to the phone. This address may be referred to as $A_P$ (primary address), and the other address may be referred to as $A_S$ (secondary address). The device 130 that is determined to connect to the device 110-a may then become the primary device 130 and the other device 130 may then become the secondary device 130.

That is, once the device 130-a and device 130-b establish the LE connection and exchange their BD_ADDRs, the device 130-a and device 130-b may decide roles amongst the two devices (e.g., where one of device 130-a and device 130-b is the primary and the other is the secondary), as well as which BD_ADDR will be exposed to the device 110-a (e.g., which may be maintained by both devices as $A_P$). For example, device 130-a may have an address A1 and device 130-b may have an address A2. Once the device 130-a and device 130-b decide which device will take the primary role, the address of that primary device may be set to $A_P$. As such, should the role of the devices change (e.g., should either of device 130-a and device 130-b switch from operating in a primary role to a secondary role, or vice-versa), the new device 130 operating in the primary role may still use the same $A_P$ (e.g., which may, in some cases, be the BD_ADDR of the other device 130 now operating in the secondary role). That is, $A_P$ (and thus $A_S$) may be set to either A1 or A2. However, it is also possible that $A_P$ may be a third address that is different from both A1 and A2, and is known to both the device 130-a and device 130-b. Both device 130-a and device 130-b may use $A_P$ to communicate with the phone (e.g., when device 130-a or device 130-b is operating in the primary role), and device 130-a and device 130-b may use A1 and A2 to communicate with each other.

The primary device 130 (e.g., the device 130 initially determined to operate in the primary role) may transfer its device root keys to the secondary device 130. Having the same device root key values may allow the two devices 130 to generate the same IRK value to be used with the device 110-a (which may be referred to herein as $IRK_P$). Having the same device root key values may also allow device 130-*a* and device 130-*b* to generate the LTK value to be used with the device 110-*a* if LE legacy pairing were to be performed with the device 110-*a* (e.g., if the device 110-*a* does not support LE Secure Connections).

The primary device 130 may then connect and pair with the device 110-*a* using $A_P$ on the BR/EDR transport. If the device 110-*a* supports cross-transport key derivation, then the LTK for the LE transport may also be derived and the identity information ($IRK_P$, $A_P$) may be distributed to the device 110-*a*. Otherwise, the primary device 130 may connect on the LE transport and may perform LE pairing. If LE Secure Connections pairing was performed, then an LTK may be generated. The primary device 130 may distribute the identity information ($IRK_P$, $A_P$) to the device 110-*a*. If LE legacy pairing was performed, then the primary device 130 may distribute LTK, EDIV, RAND to the phone and may remember a DIV value masked in EDIT. The distributed LTK value may be generated by the primary device 130 using the stored DIV value and the RAND value provided by the master during the encryption setup later. Alternatively, the primary device 130 may just remember the distributed LTK.

After connecting and pairing with the device 110-*a*, the primary device 130 may then send device 110-*a* connection information to the secondary device 130. For example, the primary device 130 may send the BD_ADDR of the device 110-*a*, as well as the Link Key to be used on a BR/EDR connection with the device 110-*a*, to the secondary device 130. In some cases (e.g., if cross-transport key derivation or LE pairing has been done with the device 110-*a*), the primary device 130 may also send the device 110-*a* identity information (e.g., IRK) to the secondary device 130. In some cases (e.g., if LE Secure Connections pairing was performed), the primary device 130 may also send the LTK, to be used on an LE connection with the device 110-*a*, to the secondary device 130. In some cases, the LTK to be used on an LE connection with the device 110-*a* may also be derivable from the BR/EDR Link Key. In some cases (e.g., if LE legacy pairing was performed), the primary device 130 may also send the DIV and RAND values (e.g., used to generate the LTK) to the secondary device 130. Alternatively, just the distributed LTK value may also be provided.

Such a procedure (e.g., deciding an $A_P$, primary device 130 connection to a device 110, primary device 130 sending device 110 connection information to the secondary device 130, etc.) may then repeated, for example, if the user wants to pair the earbuds with a second device 110, if the user wants to pair the earbuds with an LE-only device, etc.

Following the primary device 130 exchange of device 110 connection information to the secondary device 130, either device 130 (e.g., either of device 130-*a* or device 130-*b*) may assume the role of the primary device 130 and may connect to the phone using $A_P$ on the BR/EDR transport and using the identity information ($IRK_P$, $A_P$) on the LE transport. The earbuds ay appear as a single device (e.g., as a paired device 115-*a*) to the device 110-*a* (e.g., a phone's Bluetooth connection selection menu). That is, a device 130 operating in a secondary role (e.g., after receiving device 110 connection information from the device 130 operating in the primary role) may, under some circumstances or scenarios described herein, switch from the secondary role to the primary role (e.g., and may connect to the phone using $A_P$ on the BR/EDR transport and using the identity information ($IRK_P$, $A_P$) on the LE transport based at least in part on some information received from the device 130 that previously held the primary role).

The techniques described herein may further be used for any replacement components (e.g., replacement earbuds) for a paired device 115-*a*. For example, if for some reason one device 130 (e.g., an earbud of some pair of earbuds) is to be replaced (e.g., if it gets lost, damaged, etc.), then the new device 130 may connect and pair with a maintained device 130 (e.g., a maintained earbud) using the LE transport as described herein. In some cases, some user interaction may be involved. The older device 130 (e.g., the maintained earbud or the maintained component of paired device 115-*a*) may then transfer the pairing information of all devices (e.g., device 110-*a*) that the maintained device 130 (e.g., that the paired device 115-*a*) was connected to. The $A_P$ and root key values being used may not change by default (e.g., even if they were of the device 130 being replaced) such that the paired device 115 (e.g., the maintained device 130 and the new device 130) may not have to re-pair with all devices. However, in some cases a user or customer (e.g., an original equipment manufacturer (OEM)) may choose to enforce a reset of all pairing information (e.g., upon addition of a new or replacement device 130, for a paired device 115).

In some examples, devices (e.g., earbuds of a pair of Bluetooth earbuds) may dynamically select or switch between primary and secondary roles based on various conditions or scenarios (e.g., based on user interaction or user selection, such that some quality condition of a primary Bluetooth-enabled device is higher than a quality condition of a secondary Bluetooth-enabled device). The quality condition may include, but is not limited to, a signal quality, a signal strength, a microphone quality, a battery level, or a physical location (e.g., a range from the Bluetooth-enabled device to the source device), or any combination thereof. In some cases, these examples, among others, are described more herein.

For example, in some cases, a paired device 115 may determine that a signal quality associated with the Bluetooth connection between the primary Bluetooth-enabled device 130-*a* and the device 110-*a* is lower than a signal quality associated with the Bluetooth connection between the secondary Bluetooth-enabled device 130-*b* and the device 110-*a*. For example, the signal quality associated with the primary Bluetooth-enabled device 130-*a* may be below a threshold dBm, while the signal quality associated with the secondary Bluetooth-enabled device 130-*b* may be equal to or greater than the threshold dBm. In such cases, the Bluetooth-enabled device 130-*b* may switch to operate in the primary role and the Bluetooth-enabled device 130-*a* may switch to operate in the secondary role.

In other examples, a device 130 may identify a battery condition and may operate in a primary or secondary role based on the battery condition. For example, if a battery level of the primary Bluetooth-enabled device 130-*a* is lower than a battery level of the secondary Bluetooth-enabled device 130-*b*, the Bluetooth-enabled device 130-*b* may switch to operate in the primary role and the Bluetooth-enabled device 130-*a* may switch to operate in the secondary role. In other examples, a physical location (e.g., or range from the device 110-*a*) of the primary Bluetooth-enabled device 130-*a* may be above a threshold range from the device 110-*a* compared to the physical location of the secondary Bluetooth-enabled device 130-*b*, and the Bluetooth-enabled device 130-*b* may switch to operate in the primary role and the Bluetooth-enabled device 130-*a* may switch to operate in the secondary role. In yet other examples, a device 130 may be selected by a user (e.g., a user may power on or press a button on a device 130-*a*, and the device 130-*a* may thus operate in the primary role and the device 130-*b* may assume the secondary role). Various other examples for primary/secondary role selection by devices 130 are described herein, for example, with reference to FIG. 6.

Devices 130 (e.g., device 130-*a* and device 130-*b*) may thus support Bluetooth address management according to the techniques described herein. For example, two devices 130 using TWS Shadowing (e.g., device 130-*a* and device 130-*b*) may agree on a primary address (e.g., a primary BD_ADDR, $A_P$) used with the audio source device (e.g., device 110-*a*) when connecting via BR/EDR or LE. These techniques may reduce overhead signaling and latency related to device role switching (e.g., overhead signaling and latency associated with lost connections, with primary/secondary role switching, etc.). As one example, the devices 130 may perform address management techniques described herein during connection procedures (e.g., over an LE connection) such that each device 130 may connect to a source device (e.g., a device 110) using a primary address (e.g., a primary BD_ADDR, $A_p$). As such, either device 130 (e.g., either earbud of a paired device 115) may connect to the source device 110 using the primary address, and may appear to the source device 110 as a single device. Further, upon an initial connection between a primary device 130 and the source device 110, the primary device 130 may send source device connection information (e.g., a Bluetooth address of the device 110, a link key to be used on a connection with the device 110, an identity resolving key of the device 110, a device root key of the primary device, a long term key to be used on the connection with the device 110, information to generate the long term key to be used on the connection with the device 110, etc.) to the secondary device 130. As such, the secondary device 130 may later connect to the device 110 and operate in the primary role (e.g., using the source device connection information).

Figure 2:
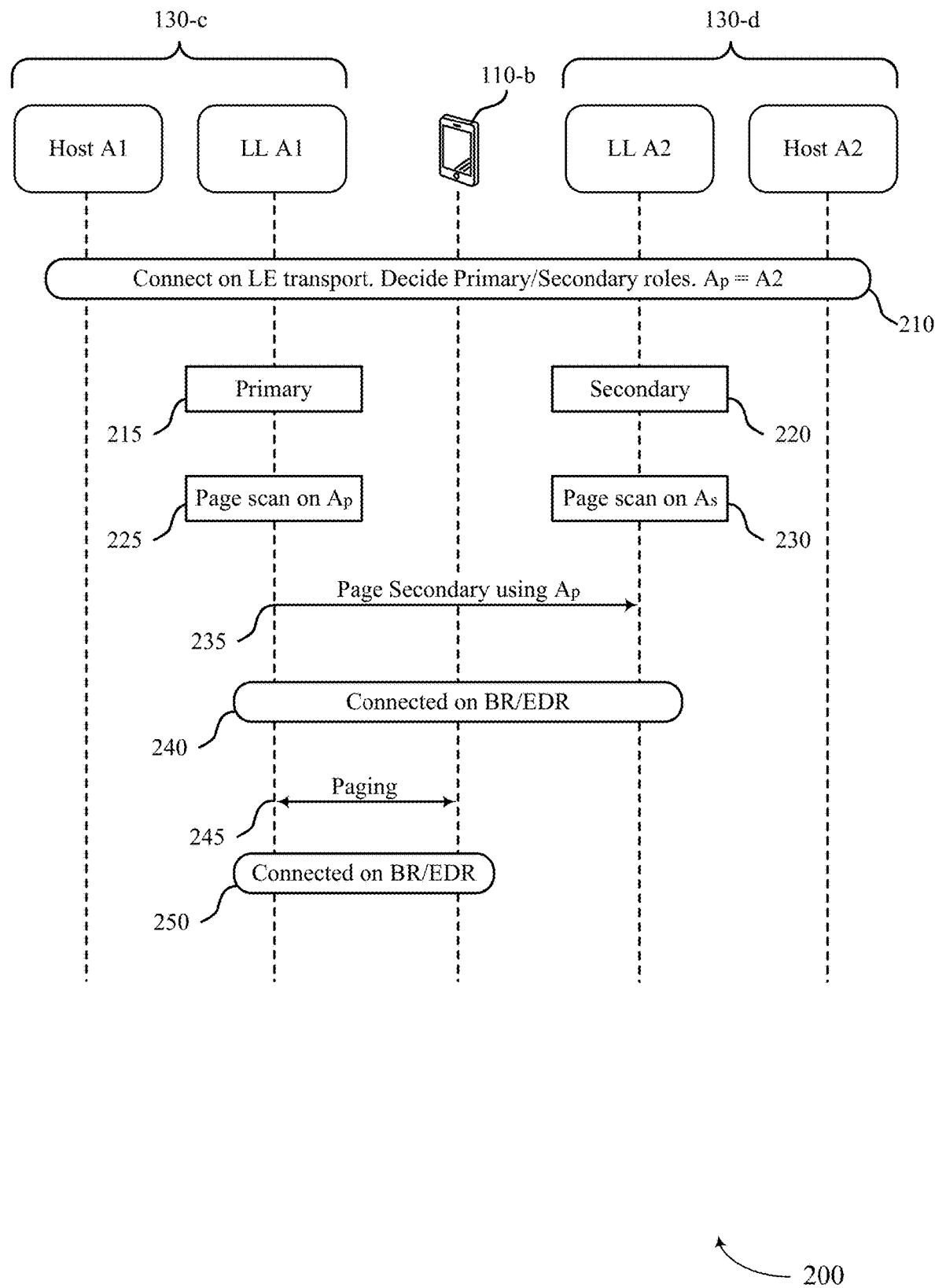
FIG. 2 illustrates an example of a process flow that supports address management for Bluetooth devices in accordance with aspects of the present disclosure.

FIG. 2 illustrates an example of a process flow 200 that supports address management for Bluetooth devices in accordance with aspects of the present disclosure. The process flow 200 may be related to a system that includes a device 110-*b*, which may be an example of the corresponding devices 110 described with reference to FIG. 1. In some examples, the process flow 200 may also be related to a system that includes, for example, a paired device 115 (e.g., which may be an example of the corresponding devices as described with reference to FIG. 1), and the paired device 115 may include a first host (e.g., Host A1), a first controller (e.g., LL A1), a second controller (e.g., LL A2), and a second host (e.g., Host A2). In some cases, the first host and the first controller may, in some examples, be a logical entity, which may be part of, for example, a first Bluetooth-enabled device (e.g., device 130-*c*) of the paired device 115. The second controller and the second host may, in some examples, be a logical entity, which may be part of a second Bluetooth-enabled device (e.g., device 130-*d*) of the paired device 115. For example, the first Bluetooth-enabled device 130-*c* (e.g., including Host A1 and LL A1) and the second Bluetooth-enabled device 130-*d* (e.g., including Host A2 and LL A2) may be a pair of wireless Bluetooth earbuds or a wireless Bluetooth headset. In some examples, the host and the controller may be collectively referred to as a Bluetooth-enabled device.

The process flow 200 may implement aspects associated with the wireless communications system 100. For example, a first Bluetooth-enabled device (e.g., a device including Host A1 and LL A1, such as a device 130-*c*) and a second Bluetooth-enabled device (e.g., a device including Host A2 and LL A2, such as device 130-*d*) may support Bluetooth address management techniques described herein. For example, device 130-*c* and device 130-*d* may exchange BD_ADDRs and may dynamically switch between primary and secondary roles, as described herein. In the following description of the process flow 200, the operations between the device 110-*b*, the device 130-*c* (e.g., the Host A1 and the LL A1), and the device 130-*d* (e.g., the Host A2 and the LL A2) may be transmitted in a different order than the exemplary order shown, or the operations performed by the device 110-*b*, the device 130-*c*, and the device 130-*d* may be performed in different orders or at different times. Certain operations may also be omitted from the process flow 200, and/or other operations may be added to the process flow 200.

Process flow 200 may illustrate connecting on BR/EDR transports, in accordance with aspects of the techniques described herein. At 210, device 130-*c* and device 130-*d* may connect on the LE transport and may decide primary and secondary roles amongst themselves. In the example of FIG. 2, device 130-*c* and device 130-*d* may decide for device 130-*c* to operate in the primary role and for device 130-*d* to operate in the secondary role. In some cases, device 130-*c* and device 130-*d* may exchange BD_ADDRs (e.g., device 130-*c* may communicate its BD_ADDR, A1, to device 130-*d*, and device 130-*d* may communicate its BD_ADDR, A2, to device 130-*c*) over the LE connection. Device 130-*c* and device 130-*d* may then device primary and secondary roles based at least in part on the devices exchanging their BD_ADDRs.

In the present example, the primary address may be set to A2 (e.g., $A_P$=A2), however device 130-*c* may be decided to operate in the primary role. In some cases, the decision for primary and secondary roles between device 130-*c* and device 130-*d* may be decided based at least in part on a quality condition or device status associated with the device 130-*c*, the device 130-*d*, or both. Example quality conditions may include, a signal quality, a signal strength, a microphone quality, a battery level, or a physical location (e.g., a range to a device 110), or any combination thereof.

Example device statuses may include a device activity level (e.g., whether the device 130 is currently connected to a device 110, on a call), a user selected status, a previous role or previous primary/secondary status, etc. These examples, among others, are described more herein (e.g., with reference to FIG. 6). At 215, device 130-*c* may establish itself (e.g., begin operation as) the primary device (e.g., device 130-*c* may operate in the primary role). At 220, device 130-*d* may establish itself (e.g., begin operation as) the secondary device (e.g., device 130-*d* may operate in the secondary role).

Once the devices 130 have decided which one will be primary and which one will be secondary (e.g., once at least one of the device 130 has determined that it will operate in a first role), the primary device (e.g., device 130-*c*) may perform a page scanning procedure on $A_P$ (e.g., at 225), page the device 110-*b* using $A_P$ (e.g., at 245), or both. In some cases, the primary device 130-*c* may be the slave to the device 110-*b* (e.g., the device 130-*c* and the device 110-*b* may communicate via a master-slave relationship, where the device 130-*c* operates in the slave role and device 110-*b* operates in the master role).

At 230, the secondary device 130-*d* may perform a page scanning procedure on $A_S$. At 235, the primary device 130-*c* may then page the secondary device 130-*d* using $A_P$. At 240, the device 130-*c* and the device 130-*d* may establish a connection on BR/EDR. In some cases, the primary device 130-*c* may typically be the master to the secondary device 130-*d*. Such may allow the primary device 130-*c* to use the same address ($A_P$) on both the piconets to the device 110-*b* and to the secondary device 130-*d* (e.g., which may be a single piconet if the primary device 130-*c* is master of both). Such may also provide for limiting the device 110-*b* ability to page the secondary device 130-*d* (e.g., since the device 110-*b* may not be aware of the BD_ADDR which is not the primary BD_ADDR).

At 250, the primary device (e.g., device 130-*c*) and the device 110-*b* may establish a connection on BR/EDR (e.g., based on the paging at 245, where the device 130-*c* may page the device 110-*b* or the source device 110-*b* may page the device 130-*c*). That is, the device 110-*b* and a paired device 115 (e.g., a pair of wireless Bluetooth earbuds or a wireless Bluetooth headset) may establish a connection.

For example, the device 110-*b* and the paired device (e.g., the Host A1, the LL A1, the Host A2, and the LL A2) may establish a Bluetooth connection via device 130-*c* operating in the primary role. In some cases, the Bluetooth connection may include a set of one or more logical transport channels. For example, the LL A1 (e.g., which may be referred to as a primary controller when device 130-*c* is operating in the primary role) may transmit one or more packets to the device 110-*b* via the Bluetooth connection, while the LL A2 (e.g., which may be referred to as a secondary controller when device 130-*d* is operating in the secondary role) may shadow (e.g., monitor) the Bluetooth connection (e.g., the logical transport channel).

For example, the device 130-*d* (e.g., the LL A2) may receive information (e.g., voice and audio data) exchanged by listening to (e.g., eavesdropping on) the Bluetooth connection. In some examples, a logical transport channel of the set associated with the Bluetooth connection may be a connection, such as an eSCO connection, for a voice call (e.g., which may allow for retransmission). Generally, the primary device 130-*c* (e.g., the primary controller, LL A1) may continue to communicate packets to and from the device 110-*b* via the Bluetooth connection, while the device 130-*d* (e.g., the secondary controller, LL A2) may continue to shadow (e.g., sniff) the Bluetooth connection.

Figure 3:
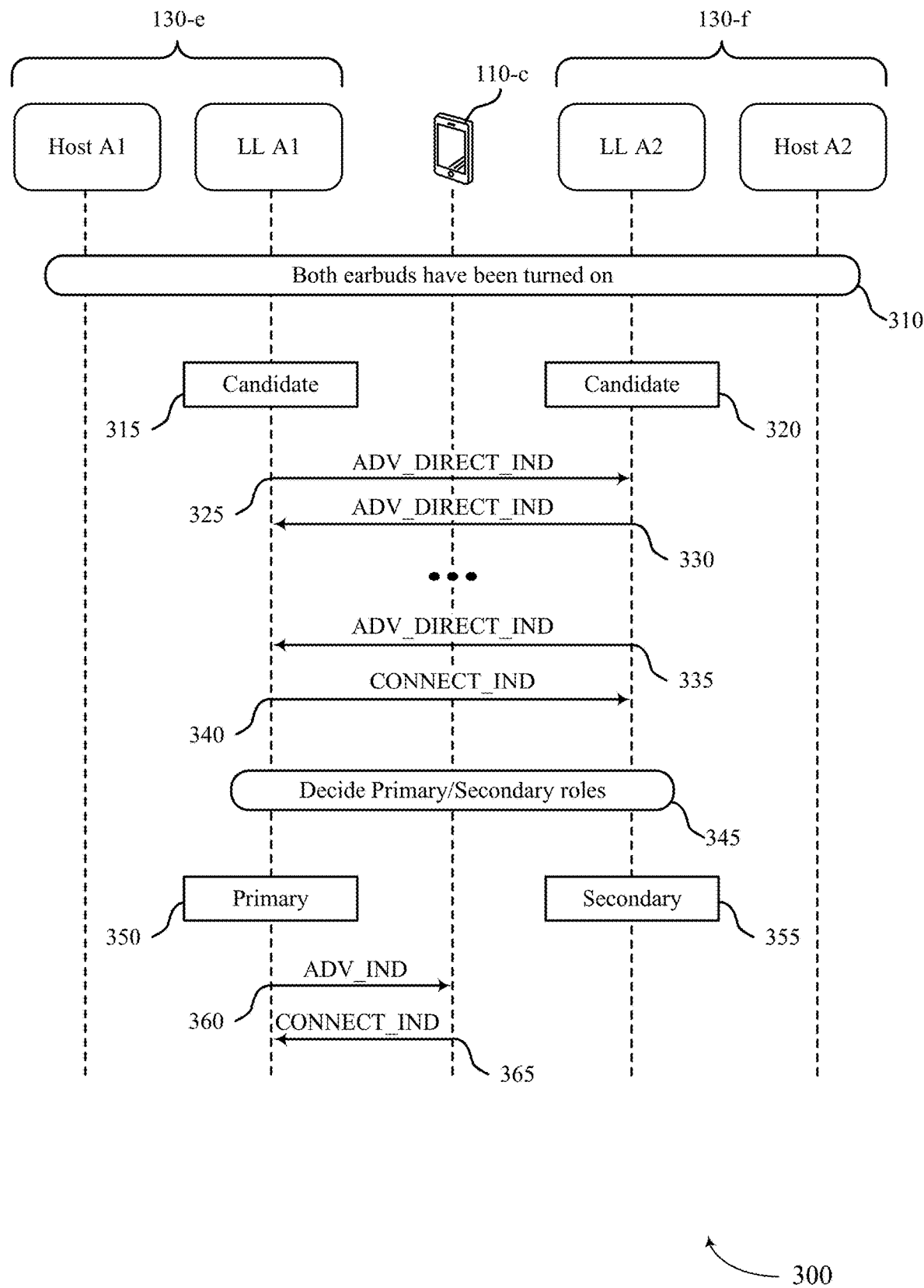
FIG. 3 illustrates an example of a process flow that supports address management for Bluetooth devices in accordance with aspects of the present disclosure.

FIG. 3 illustrates an example of a process flow 300 that supports address management for Bluetooth devices in accordance with aspects of the present disclosure. The process flow 300 may be related to a system that includes a device 110-*c*, which may be an example of the corresponding devices 110 described with reference to FIGS. 1 and 2. In some examples, the process flow 300 may also be related to a system that includes, for example, a paired device 115 (e.g., which may be an example of the corresponding devices as described with reference to FIG. 1), and the paired device 115 may include a first host (e.g., Host A1), a first controller (e.g., LL A1), a second controller (e.g., LL A2), and a second host (e.g., Host A2). In some cases, the first host and the first controller may, in some examples, be a logical entity, which may be part of, for example, a first Bluetooth-enabled device (e.g., device 130-*e*) of the paired device 115. The second controller and the second host may, in some examples, be a logical entity, which may be part of a second Bluetooth-enabled device (e.g., device 130-*f*) of the paired device 115. For example, the first Bluetooth-enabled device 130-*e* (e.g., including Host A1 and LL A1) and the second Bluetooth-enabled device 130-*f* (e.g., including Host A2 and LL A2) may be a pair of wireless Bluetooth earbuds or a wireless Bluetooth headset. In some examples, the host and the controller may be collectively referred to as a Bluetooth-enabled device.

The process flow 300 may implement aspects associated with the wireless communications system 100. For example, a first Bluetooth-enabled device (e.g., a device including Host A1 and LL A1, such as a device 130-*e*) and a second Bluetooth-enabled device (e.g., a device including Host A2 and LL A2, such as device 130-*f*) may support Bluetooth address management techniques described herein. For example, device 130-*e* and device 130-*f* may exchange BD_ADDRs and may dynamically switch between primary and secondary roles, as described herein. In the following description of the process flow 300, the operations between the device 110-*c*, the device 130-*e* (e.g., the Host A1 and the LL A1), and the device 130-*f* (e.g., the Host A2 and the LL A2) may be transmitted in a different order than the exemplary order shown, or the operations performed by the device 110-*c*, the device 130-*e*, and the device 130-*f* may be performed in different orders or at different times. Certain operations may also be omitted from the process flow 300, and/or other operations may be added to the process flow 300.

Process flow 300 may illustrate initial LE transport connection between devices 130, in accordance with aspects of the techniques described herein. In the example of FIG. 3, the decision on which device 130 will be primary and which will be secondary may be made on the LE transport itself. At 310, both devices 130 (e.g., two earbuds) may be turned on (e.g., either at the same time or in parallel, sequentially at different times). Connecting on the LE transport may be slightly different from connecting on the BR/EDR transport, as the decision on which device 130 will be primary may be made on the LE transport itself.

When a device 130 is turned on (e.g., when a device 130, such as an earbud, is taken out of the charging case), for some period of time (e.g., at 315 and 320), the device 130 may enter a state which may be referred to herein as a Candidate state (e.g., as further described with reference to FIG. 6). In this Candidate state, the device 130 may not yet have assumed the role of the primary or secondary, hence the device 130 may perform a connectable directed advertisement procedure with (e.g., to) the other device 130. At the same time, the device 130 may initiate an LE connection to the other device 130. For example, device 130-*e* may perform a connected directed advertisement procedure to device 130-*f*. For the connectable directed advertisement (e.g., at 325), the AdvA may be set to an RPA that is generated using $IRK_P$. The initial address or target address (InitA/TargetA) may be set to an RPA that is also generated using $IRK_P$. That is, 325 and 330 through 335 may refer to a connectable directed advertisement, ADV_DIRECT_IND (AdvA=RPA(IRKP), InitA=RPA(IRKP)). At 340, device 130-*e* may initiate an LE connection, sending CONNECT_IND to device 130-*f*.

For some solutions where the devices 130 do not support Controller-based privacy (e.g., as further described with reference to FIG. 4), the InitA/TargetA may be set to $A_P$ and the devices 130 may scan for advertisements, resolve the AdvA RPA, and then initiate a connection to that RPA. Doing directed advertising may limit the device 110-*c* ability to connect to a device 130 that has still not assumed the role of the primary. Setting both the AdvA and InitA/TargetA to an address that is of the same identity means that the devices 130 may not have to look for more than one identity (e.g., since the other device 130 may already be in the process of connecting to the device 110-*c* using the identity ($IRK_P$, $A_P$)).

In some cases, both devices 130 may be turned on at the same time and may thus perform directed advertisement to each other and may also initiate a connection to each other. Once the LE connection gets created, the primary/secondary roles may get decided (e.g., at 345). The primary device 130 (e.g., device 130-*e*) may then transition to the "primary" state (e.g., at 350, as further described herein, for example, with reference to FIG. 6) and may perform connectable undirected advertisement with AdvA set to an RPA that is generated using $IRK_P$ so that the device 110-*c* (e.g., the phone) can connect to it (e.g., 360 may refer to refer to a connectable directed advertisement, ADV_IND (AdvA=RPA(IRKP)), and 365 may refer to a connection message, CONNECT_IND). If the primary secondary connection goes down for some reason, the secondary device may now reconnect to the primary device using the same connectable undirected advertisement. Such may allow for the primary device to perform a single advertising train (set) for both the device 110-*c* and the secondary device. In some cases, the secondary/other device may see no difference in initiating a connection to a connectable undirected advertisement or a connectable directed advertisement.

Figure 4:
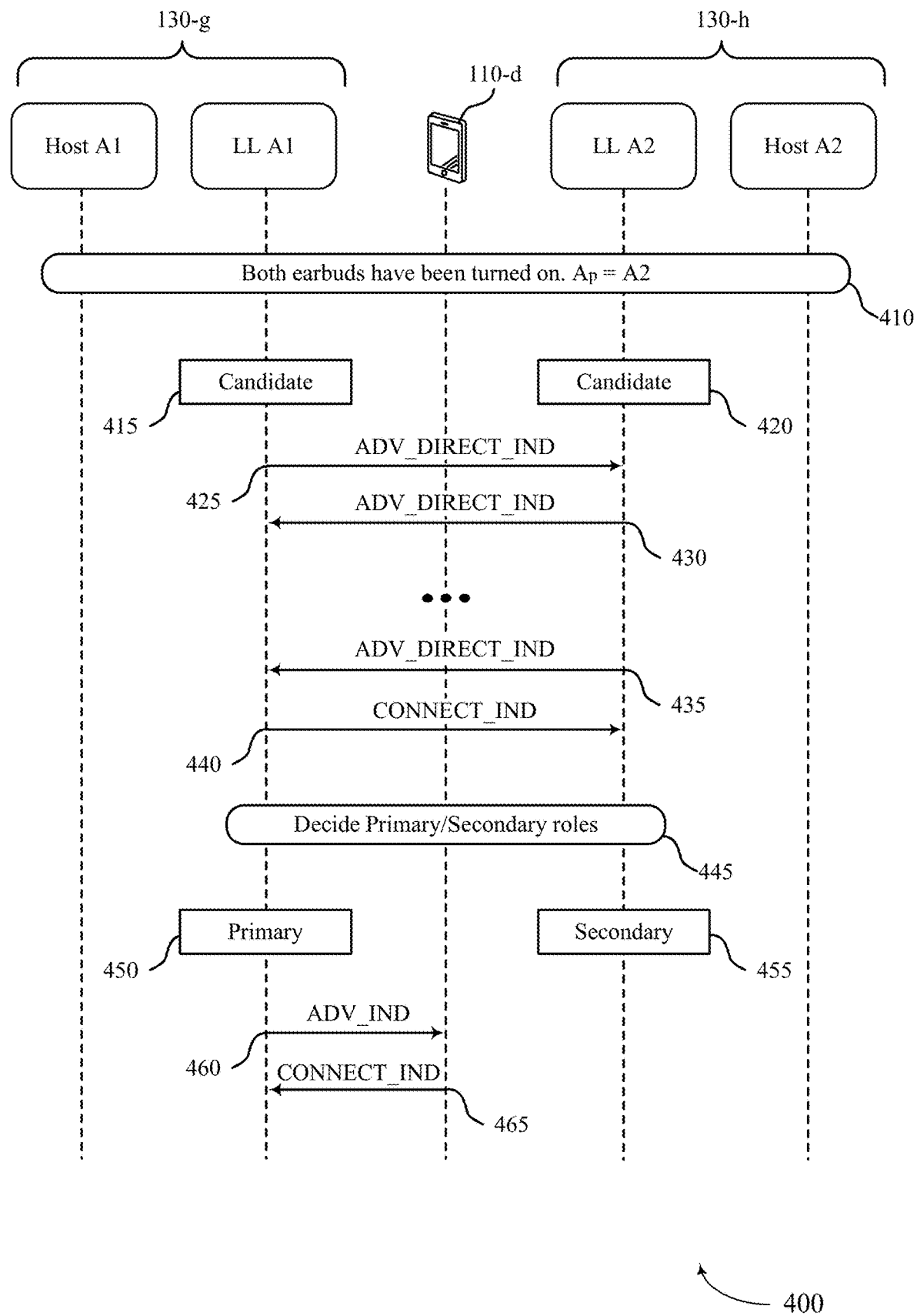
FIG. 4 illustrates an example of a process flow that supports address management for Bluetooth devices in accordance with aspects of the present disclosure.

FIG. 4 illustrates an example of a process flow 400 that supports address management for Bluetooth devices in accordance with aspects of the present disclosure. The process flow 400 may be related to a system that includes a device 110-*d*, which may be an example of the corresponding devices 110 described with reference to FIGS. 1, 2, and 3. In some examples, the process flow 400 may also be related to a system that includes, for example, a paired device 115 (e.g., which may be an example of the corresponding devices as described with reference to FIG. 1), and the paired device 115 may include a first host (e.g., Host A1), a first controller (e.g., LL A1), a second controller (e.g., LL A2), and a second host (e.g., Host A2).

In some cases, the first host and the first controller may be a logical entity, which may be part of, for example, a first Bluetooth-enabled device (e.g., device 130-*g*) of the paired device 115. The second controller and the second host may also be a logical entity, which may be part of a second Bluetooth-enabled device (e.g., device 130-*h*) of the paired device 115. For example, the first Bluetooth-enabled device 130-*g* (e.g., including Host A1 and LL A1) and the second Bluetooth-enabled device 130-*h* (e.g., including Host A2 and LL A2) may be a pair of wireless Bluetooth earbuds or a wireless Bluetooth headset. In some examples, the host and the controller may be collectively referred to as a Bluetooth-enabled device.

The process flow 400 may implement aspects associated with the wireless communications system 100. For example, a first Bluetooth-enabled device (e.g., a device including Host A1 and LL A1, such as a device 130-*g*) and a second Bluetooth-enabled device (e.g., a device including Host A2 and LL A2, such as device 130-*h*) may support Bluetooth address management techniques described herein. For example, device 130-*g* and device 130-*h* may exchange BD_ADDRs and may dynamically switch between primary and secondary roles, as described herein. In the following description of the process flow 400, the operations between the device 110-*d*, the device 130-*g* (e.g., the Host A1 and the LL A1), and the device 130-*h* (e.g., the Host A2 and the LL A2) may be transmitted in a different order than the exemplary order shown, or the operations performed by the device 110-*d*, the device 130-*g*, and the device 130-*h* may be performed in different orders or at different times. Certain operations may also be omitted from the process flow 400, and/or other operations may be added to the process flow 400.

Process flow 400 may illustrate initial LE transport connection between devices 130 (e.g., when devices 130 do not support controller-based privacy), in accordance with aspects of the techniques described herein. That is, the example of FIG. 4 may illustrate the case where the devices 130 do not support controller-based privacy and thus the InitA/TargetA may be set to $A_P$. At 410, both devices 130 (e.g., two earbuds) may be turned on (e.g., either at the same time or in parallel, sequentially at different times, etc.). Connecting on the LE transport may be slightly different from connecting on the BR/EDR transport, as the decision on which device 130 will be primary may be made on the LE transport itself.

When a device 130 is turned on (e.g., when a device 130, such as an earbud, is taken out of the charging case), for some period of time (e.g., at 415 and 420), the device 130 may enter a state which may be referred to herein as a Candidate state (e.g., as further described with reference to FIG. 6). In this Candidate state, the device 130 may not yet have assumed the role of the primary or secondary, hence the device 130 may perform a connectable directed advertisement procedure with (e.g., to) the other device 130. At the same time, the device 130 may initiate an LE connection to the other device 130. For example, device 130-*g* may perform a connected directed advertisement procedure to device 130-*h*. For the connectable directed advertisement (e.g., at 425), the AdvA may be set to an RPA that is generated using $IRK_P$. The InitA/TargetA may be set to $A_P$. That is, 425 and 430 through 435 may refer to a connectable directed advertisement, ADV_DIRECT_IND(AdvA=RPA (IRKP), InitA=$A_P$). At 440, device 130-*g* may initiate an LE connection, sending CONNECT_IND to device 130-*h*.

That is, in cases where the devices 130 do not support Controller-based privacy, the InitA/TargetA may be set to $A_P$ and the devices 130 may scan for advertisements, resolve the AdvA RPA, and then initiate a connection to that RPA. Doing directed advertising may limit the device 110-*d* ability to connect to a device 130 that has still not assumed the role of the primary. Setting both the AdvA and InitA/TargetA to an address that is of the same identity means that the devices 130 may not have to look for more than one identity (e.g., since the other device 130 may already be in the process of connecting to the device 110-*d* using the identity ($IRK_P$, $A_P$)).

In some cases, both devices 130 may be turned on at the same time and may thus perform directed advertisement to each other and may also initiate a connection to each other. Once the LE connection gets created, the primary/secondary roles may get decided (e.g., at 445). The primary device 130 (e.g., device 130-*g*) may then transition to the "primary" state (e.g., at 450, as further described herein, for example, with reference to FIG. 6) and may perform connectable undirected advertisement with AdvA set to an RPA that is generated using $IRK_P$ so that the device 110-*d* (e.g., the phone) can connect to it (e.g., 460 may refer to refer to a connectable directed advertisement, ADV_IND (AdvA=RPA(IRKP)), and 465 may refer to a connection message, CONNECT_IND).

If the primary secondary connection goes down for some reason, the secondary device may now reconnect to the primary device using the same connectable undirected advertisement. Such may allow for the primary device to perform a single advertising train (set) for both the device 110-*d* and the secondary device. In some cases, the secondary/other device may see no difference in initiating a connection to a connectable undirected advertisement or a connectable directed advertisement.

Figure 5:
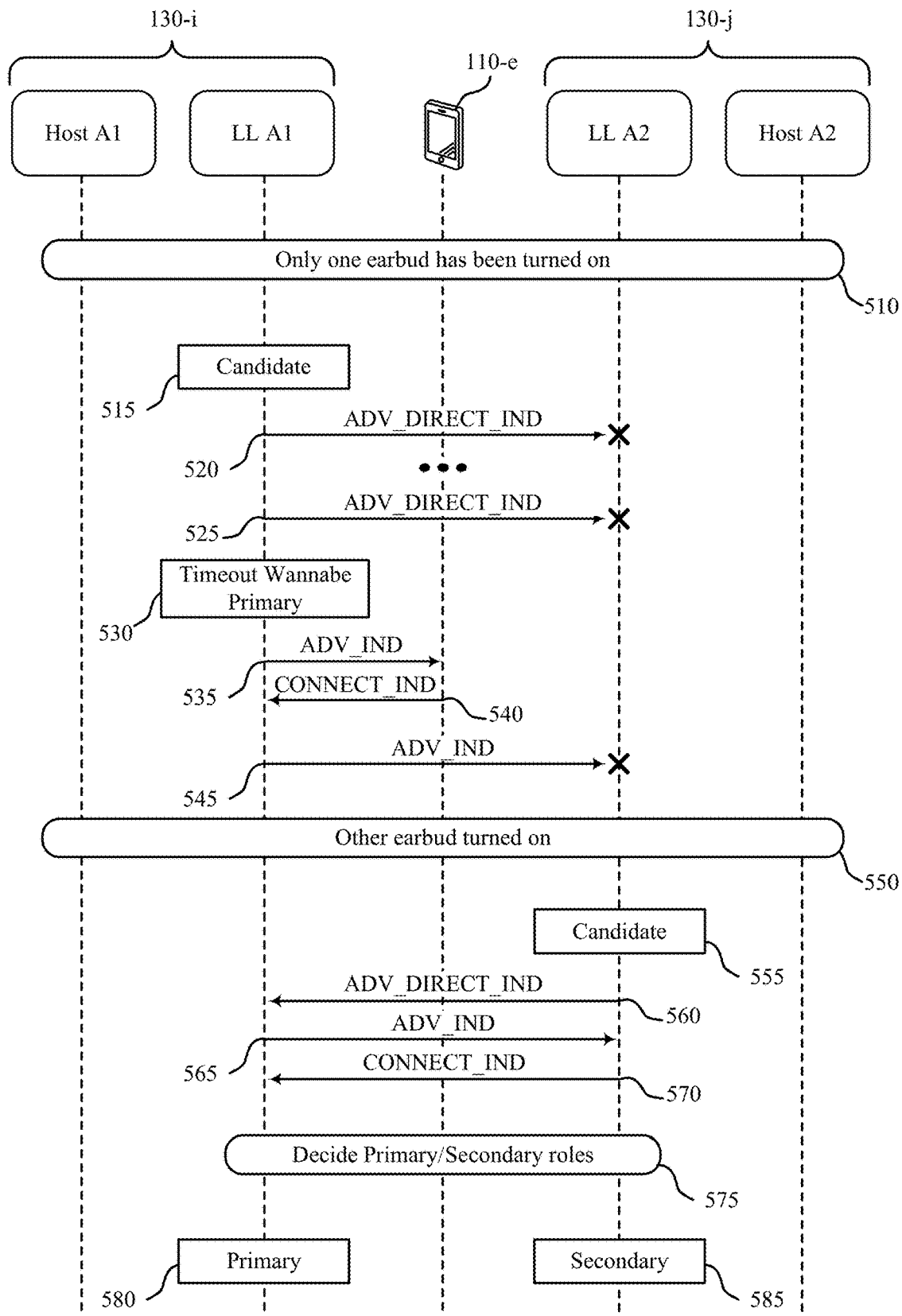
FIG. 5 illustrates an example of a process flow that supports address management for Bluetooth devices in accordance with aspects of the present disclosure.

FIG. 5 illustrates an example of a process flow 500 that supports address management for Bluetooth devices in accordance with aspects of the present disclosure. The process flow 500 may be related to a system that includes a device 110-e, which may be an example of the corresponding devices 110 described with reference to FIGS. 1, 2, 3, and 4. In some examples, the process flow 500 may also be related to a system that includes, for example, a paired device 115 (e.g., which may be an example of the corresponding devices as described with reference to FIG. 1), and the paired device 115 may include a first host (e.g., Host A1), a first controller (e.g., LL A1), a second controller (e.g., LL A2), and a second host (e.g., Host A2). In some cases, the first host and the first controller may be a logical entity, which may be part of, for example, a first Bluetooth-enabled device (e.g., device 130-i) of the paired device 115. The second controller and the second host may also be a logical entity, which may be part of a second Bluetooth-enabled device (e.g., device 130-j) of the paired device 115. For example, the first Bluetooth-enabled device 130-i (e.g., including Host A1 and LL A1) and the second Bluetooth-enabled device 130-j (e.g., including Host A2 and LL A2) may be a pair of wireless Bluetooth earbuds or a wireless Bluetooth headset. In some examples, the host and the controller may be collectively referred to as a Bluetooth-enabled device.

The process flow 500 may implement aspects associated with the wireless communications system 100. For example, a first Bluetooth-enabled device (e.g., a device including Host A1 and LL A1, such as a device 130-i) and a second Bluetooth-enabled device (e.g., a device including Host A2 and LL A2, such as device 130-j) may support Bluetooth address management techniques described herein. For example, device 130-i and device 130-j may exchange BD_ADDRs and may dynamically switch between primary and secondary roles, as described herein. In the following description of the process flow 500, the operations between the device 110-e, the device 130-i (e.g., the Host A1 and the LL A1), and the device 130-j (e.g., the Host A2 and the LL A2) may be transmitted in a different order than the exemplary order shown, or the operations performed by the device 110-e, the device 130-i, and the device 130-j may be performed in different orders or at different times. Certain operations may also be omitted from the process flow 500, and/or other operations may be added to the process flow 500.

Process flow 500 may illustrate LE transport connection between a device 130 and a device 110, in accordance with aspects of the techniques described herein. In the example of FIG. 5, devices 130 (e.g., device 130-i and device 130-j) may remain connected over LE for a duration (e.g., an extended period of time) before they decide the primary/secondary roles. For example, if both device 130-i and device 130-j are in the case, or if both device 130-i and device 130-j are stationary but out of case, then device 130-i and device 130-j may remain connected over LE. The primary/secondary roles may be decided when a trigger occurs (e.g., when device 130-i and/or device 130-j are removed from case, when motion of device 130-i and/or device 130-j is detected, when a user pushes a button on device 130-i and/or device 130-j, etc.).

Sometimes, a single device (e.g., device 130-i) may be turned on, or the two devices 130 may be out of range of each other and thus the LE connection may not yet be created. In such cases, one device (e.g., device 130-i) may enter the "Wannabe primary" state (e.g., as described in more detail herein, for example, with reference to FIG. 6) in which the device may stop the connectable directed advertisement and may start a connectable advertisement procedure with AdvA set to an RPA that is generated using $IRK_P$. Either the device 110-e or the other device (e.g., device 130-j) may connect to the device 130-i using the connectable undirected advertisements.

At 510, one device, device 130-i, may be turned on. At 515, the device 130-i may enter a state which may be referred to herein as a Candidate state. In this Candidate state, the device 130-i may not yet have assumed the role of the primary or secondary, hence the device 130 may perform a connectable directed advertisement procedure with (e.g., to) the other device (e.g., device 130-j). For example, device 130-i may perform a connected directed advertisement procedure to device 130-j. For the connectable directed advertisement (e.g., at 520 and 525), the AdvA may be set to an RPA that is generated using $IRK_P$. The InitA/TargetA may be set to an RPA that is generated using $IRK_P$. That is, 520 through 525 may refer to a connectable directed advertisement, ADV_DIRECT_IND(AdvA=RPA(IRKP), InitA=RPA(IRKP)). At 530, device 130-i may enter the "Wannabe primary" state and may stop the connectable directed advertisement.

At 535, the device 130-i may start a connectable advertisement procedure, with the device 110-e, with AdvA set to an RPA that is generated using $IRK_P$ (e.g., 535 may refer to a connectable advertisement procedure, ADV_IND (AdvA=RPA(IRKP))). At 540, device 110-e may initiate an LE connection, sending CONNECT_IND to device 130-i. As such, either the device 110-e or the other device (e.g., device 130-j) may connect to the device 130-i using the connectable undirected advertisements. At 545, the device 130-i may send a connectable advertisement (e.g., ADV_IND(AdvA=RPA(IRKP))) to the device 130-j.

At 550, the other device, device 130-j, may be turned on. At 555, the device 130-j may enter a state which may be referred to herein as a Candidate state. In this Candidate state, the device 130-j may not yet have assumed the role of the primary or secondary, hence the device 130-j may perform a connectable directed advertisement procedure with (e.g., to) the other device 130-i. For example, device 130-j may perform a connected directed advertisement procedure to device 130-i. For the connectable directed advertisement (e.g., at 560), the AdvA may be set to an RPA that is generated using $IRK_P$. The InitA/TargetA may be set to an RPA that is generated using $IRK_P$. That is, 560 may refer to a connectable directed advertisement, ADV_DIRECT_IND (AdvA=RPA(IRKP), InitA=RPA(IRKP)). At 565, device 130-i may perform connectable undirected advertisement, to device 130-j, with AdvA set to an RPA that is generated using $IRK_P$ (e.g., 565 may refer to refer to a connectable directed advertisement, ADV_IND(AdvA=RPA(IRKP)), and 570 may refer to a connection message, CONNECT_IND). At 575, the primary/secondary roles may get decided. The primary device (e.g., device 130-i) may then transition to the "primary" state (e.g., at 580) and the secondary device (e.g., device 130-j) may transition to the "secondary state (e.g., at 585).

Figure 6:
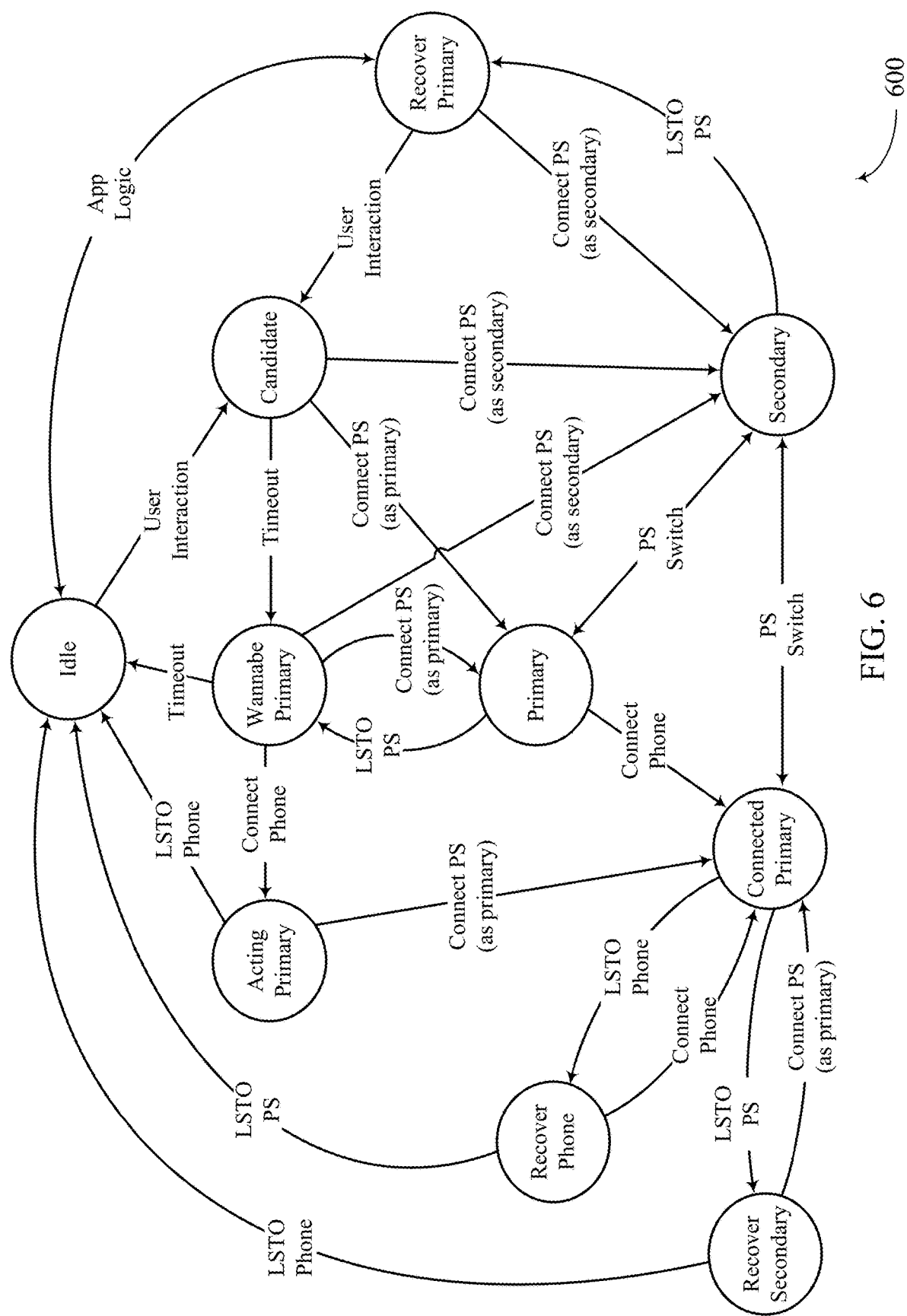
FIG. 6 illustrates an example of a device state machine that supports address management for Bluetooth devices in accordance with aspects of the present disclosure.

FIG. 6 illustrates an example of a device state machine 600 that supports address management for Bluetooth devices in accordance with aspects of the present disclosure. In some examples, device state machine 600 may implement aspects of wireless communications system 100, process flow 200, process flow 300, process flow 400, and process flow 500. For example, device state machine 600 may illustrate an example of a state machine for a device 130, as described with reference to FIGS. 1 through 5. Device state machine 600 may illustrate how two devices 130 may determine which device will the primary device with the device 110 and which device 130 will be the secondary device shadowing this connection (e.g., the connection between the primary device and the device 110).

In general, when a device 130 has had user interaction it may become the primary once. If the device 130 is operating in the primary role, and the device 130 loses both the connection with the device 110 (e.g., the phone) and the secondary device, the primary device may not attempt to reconnect to the device 110 until the primary device has had user interaction again. This means that if a device 110 leaves range (e.g., if a user walks out of range) of a device 130 (e.g., an earbud), the device 130 may disconnect and not attempt to reconnect to the device 110 when that device 110 comes back into range. The other device 130 (e.g., the other earbud), at the same time, with user interaction, may connect to the device 110 and may operate in the primary role. In some examples, a device that is not primary may be looking for its peer (e.g., the other primary device) and may try to recover that connection, although the duty cycles may be low (e.g., and therefore may take time). User interaction may move a device into a high duty cycle allowing for a rapid discovery of the peer device, that may be connected to a device 110 as a primary device, and that it should become a secondary device.

In general, devices may not attempt to connect to the device 110 until they have failed to find the peer device during a step known as 'Candidate'. During the Candidate step, both devices may aggressively (e.g., with high duty cycle) try to find each other, and only if that fails will they start to attempt to connect to the device 110. This may protect against the 'remove the devices from a case at the same time' use case. If one device is removed at a time, then that device may fail to find the other device and then connect to the device 110 and be entirely functional from the point of view of the user (e.g., either device, or either earbud, may be used independently by the user). The following tables describe the various device operation states and device state transitions of the example device state machine 600.

TABLE 1

State - Idle

| Radio Activity | Connections | Example Description |
| --- | --- | --- |
| Actions | Next State | |
| User Interaction | Candidate | User interaction may include pressing a button, taking the device(earbud) out of a case, unplugging a charger, etc. |

TABLE 2

State - Candidate

| Radio Activity | Connections | Example Description |
| --- | --- | --- |
| High duty cycle initiating | | Initiate connection to peer device(earbud) using LE |
| Low duty cycle advertising | | Allows peer to initiate connection to this device |
| Actions | Next State | |
| Timeout | Wannabe primary | (E.g., something on the order of a second) |
| Connect PS (as primary) | primary | A primary/secondary LE connection may be established. If this device was elected as primary, then we page the |

TABLE 2-continued

State - Candidate

| Radio Activity | Connections | Example Description |
| --- | --- | --- |
| | | peer and once a BR/EDR connection between the peers is established become the primary. |
| Connect PS (as secondary) | secondary | A primary/secondary LE connection is established. If this device was elected as secondary, then we page scan and once a BR/EDR connection between the peers is established become the secondary. |

TABLE 3

State - Primary

| Radio Activity | Connections | Example Description |
| --- | --- | --- |
| | Peer using BR/EDR | Now this device can establish connection with phone. Shadowing of state can occur. |
| Actions | Next State | |
| Connect Phone | Connected primary | |
| LSTO PS | Wannabe primary | Connection with peer failed, move back to being a wannabe primary as we were already confirmed as a primary device |
| PS Switch | secondary | Devices decided to do a PS Switch |

TABLE 4

State-Secondary

| Radio Activity | Connections | Example Description |
| --- | --- | --- |
| | Peer using BR/EDR | Collection of shadow state from the primary can occur. |
| Actions | Next State | |
| LSTO PS | Recovery primary | Device used to be a secondary, but it has lost its peer. Move to recover primary to try to reestablish LE connection with primary. (primary would typically move into Orphan primary) |

TABLE 5

State-Connected Primary

| Radio Activity | Connections | Example Description |
| --- | --- | --- |
| | Peer using BR/EDR Phone using BR/EDR | We are in control. We can share shadow state, and we have all the applications running. |
| Actions | Next State | |
| LSTO Phone | Recover Phone | We lost the phone. Fall back to recover phone, so that we could continue as a connected primary. If we lose connection with the secondary, then we fail to Idle. |
| LSTO PS | Recover secondary | We lost the peer. |

TABLE 6

State-Wannabe Primary

| Radio Activity | Connections | Example Description |
|---|---|---|
| Low duty cycle advertising | | Allows a candidate to quickly find this device. |
| Low duty cycle initiating | | Allows an acting primary to find this device. |
| Page Phone | | Allows headset to connect to phone without having a connection with a peer. |

| Actions | Next State | |
|---|---|---|
| Connect Phone Connect PS (as primary) | Acting primary primary | We found the phone. A primary/secondary LE connection is established. We immediately stop trying to page the phone. If this device was elected as primary, then we page the peer and once a BR/EDR connection between the peers is established become the primary. |
| Connect PS (as secondary) | secondary | A primary/secondary LE connection is established. We immediately stop trying to page the phone. If this device was elected as secondary, then we page scan and once a BR/EDR connection between the peers is established become the secondary. |
| Timeout | Idle | After a period of time, the device moves to idle as attempting more high duty cycle activity is potentially battery draining. This stops this device from being the primary until the next user interaction. |

TABLE 7

State-Acting Primary

| Radio Activity | Connections | Example Description |
|---|---|---|
| Low duty cycle advertising | Phone using BR/EDR | We are connected to the phone but are still awaiting a connection from a candidate or recover primary or wannabe primary. |

| Actions | Next State | |
|---|---|---|
| LSTO Phone | Wannabe primary | We lost connection with the phone, so just move back into the idle state as we need user interaction to enable to be the primary again. |
| Connect PS (as primary) | Connected primary | A primary/secondary LE connection is established. This device must be a primary, as we were acting as a primary, then we page the peer and once a BR/EDR connection between the peers is established become the connected primary. |

TABLE 8

State-Recover Phone

| Radio Activity | Connections | Example Description |
|---|---|---|
| | secondary with BR/EDR | We have the connection with our peer but have lost the phone. Start paging the phone to recover that connection. |

TABLE 8-continued

State-Recover Phone

| | | |
|---|---|---|
| Page Phone | | Allows headset to connect to phone without having a connection with a peer. |

| Actions | Next State | |
|---|---|---|
| Connect Phone | Connected primary | We found the phone. |
| LSTO PS | Idle | We just lost our phone, and now we have lost the secondary. We have to move back to idle as we need user interaction to attempt to become the primary again. |

TABLE 9

State-Recover Secondary

| Radio Activity | Connections | Example Description |
|---|---|---|
| Low duty cycle advertising | Phone with BR/EDR | We have the connection with the phone, but have lost our peer. Start advertising to allow the old secondary to initiate a connect back to us. |

| Actions | Next State | |
|---|---|---|
| LSTO Phone | Idle | We just lost our secondary, and now we have lost the phone. We have to move back to idle as we need user interaction to attempt to become the primary again. |
| Connect PS | Connected primary | A primary/secondary LE connection is established. This device must be a primary, as we were the primary, then we page the peer and once a BR/EDR connection between the peers is established become the connected primary. |

TABLE 10

State-Recover Primary

| Radio Activity | Connections | Example Description |
|---|---|---|
| Low duty cycle initiating | | We lost the connection with our peer. Wait for them to advertise and hopefully we'll reconnect. |

| Actions | Next State | |
|---|---|---|
| Connect PS (as secondary) | Connected primary | A primary/secondary LE connection is established. This device must be a secondary, as we were the secondary, then we page scan and once a BR/EDR connection between the peers is established become the secondary. |
| User Interaction | Candidate | User interaction will allow this device to become a primary by moving through the candidate state (to absolutely make sure the primary has been lost by using that states high duty cycle initiating to make sure). |

TABLE 11

State Path-Normal

| Device A | Trigger on A | Device B | Trigger on B | Example Description |
|---|---|---|---|---|
| Idle | | Idle | | |
| | User interaction | | User interaction | User removes both devices (earbuds) out of the case. |
| Candidate | | Candidate | | Both devices do high duty cycle initiating and low duty cycle advertising. Some randomness is used to ensure a fast connection. |
| | Connect PS (as primary) | | Connect PS (as secondary) | At some point they connect and they determine the roles they will be in. |
| primary | | secondary | | Device A pages the phone |
| | Connect Phone | | | We have connected with the phone. |
| Connected primary | | secondary | | We have the phone up and running. We can shadow state now. |
| | PS Switch | | PS Switch | Perhaps the other way around would be better . . . |
| secondary | | Connected primary | | That is better. |

TABLE 12

State Path-One Device Removed

| Device A | Trigger on A | Device B | Trigger on B | Example Description |
|---|---|---|---|---|
| Idle | | Idle | | |
| | User interaction | | | User removes one device (earbud) out of the case. |
| Candidate | | Idle | | Device A does some high duty cycle initiating and low duty cycle advertising trying to find Device B. |
| | Timeout | | | The candidate times out, moving to the wannabe primary state. |
| Wannabe primary | | Idle | | We now page the phone, and swap to low duty initiating and high duty advertising. |
| | Connect Phone | | | We connected to the phone (just like a mono-headset we are pretending to be). |
| Acting primary | | Idle | | We are still advertising at a low duty cycle trying to attract the attention of our peer. |
| | | | User Interaction | User removes the other device (earbud) out of the case. |
| Acting primary | | Candidate | | Device B starts high duty cycle initiating. |
| | Connect PS (as primary) | | Connect PS (as secondary) | Device B picks up the low duty cycle advertising done by device A in the acting primary state. |
| Connected primary | | secondary | | |

TABLE 13

State Path-Phone And Primary Walk Away From Secondary

| Device A | Trigger on A | Device B | Trigger on B | Example Description |
|---|---|---|---|---|
| | | | | Assume we got to a nice stable position |
| Connected primary | | secondary | | We start to walk away from the secondary device . . . |
| | LSTO PS | | LSTO PS | Eventually that will cause a LSTO of the PS link |

TABLE 13-continued

State Path-Phone And Primary Walk Away From Secondary

| Device A | Trigger on A | Device B | Trigger on B | Example Description |
|---|---|---|---|---|
| Recover secondary | | Recover primary | | Both devices try to recover their peer. The primary continues to be connected to the phone and operate as expected. |
| | Connect PS (as primary) | | Connect PS (as secondary) | The old secondary comes back into range, low duty initiating finding the low duty cycle advertising of the old primary. |
| Connected primary | | Connected secondary | | Back to normal. |

TABLE 14

State Path-Phone And Secondary Walk Away From Primary (Case 1)

| Device A | Trigger on A | Device B | Trigger on B | Example Description |
|---|---|---|---|---|
| Connected primary | | secondary | | Assume we got to a nice stable position We start to walk away from the primary device . . . |
| | LSTO Phone | | | Eventually that will cause a LSTO of the phone link |
| Recover Phone | | secondary | | Device A is going to start page the phone to try and reconnect. |
| | LSTO PS | | LSTO PS | Eventually the primary secondary connection is lost. |
| Idle | | Recover primary | | The old primary is now idle, waiting for user interaction. The old secondary is passively looking for a its primary by doing low duty cycle initiating. |

TABLE 15

State Path-Phone And Secondary Walk Away From Primary (Case 2)

| Device A | Trigger on A | Device B | Trigger on B | Example Description |
|---|---|---|---|---|
| Connected primary | | secondary | | Assume we got to a nice stable position We start to walk away from the primary device . . . |
| | LSTO PS | | LSTO PS | Eventually that will cause a LSTO of the primary/ secondary link |
| Recover secondary | | Recover primary | | Device A will perform low duty cycle advertising. Device B will perform low duty cycle initiating. This should allow the devices to reconnect the primary/secondary link. |
| | LSTO Phone | | | Eventually the phone connection is lost. |
| Idle | | Recover primary | | The old primary is now idle, waiting for user interaction. The old secondary is passively looking for a its primary by doing low duty cycle initiating. |

TABLE 16

State Path-Phone And Secondary Walk Away From Primary (Recover 1)

| Device A | Trigger on A | Device B | Trigger on B | Example Description |
|---|---|---|---|---|
| Idle | | Recover primary | | In the previous two scenarios, we fell back to the case where the old primary is idle, and the old secondary is in the recover primary state. The old primary is now idle, waiting for user interaction. Th eold secondary is passively looking for a its primary by doing low duty cycle initiating. |
| Candidate | User Interaction | Recover primary | | One scenario has the user press a button the primary. This places the device in the candidate state, doing low duty cycle advertising and high duty cycle initiating. The old secondary device is doing low duty cycle initiating so may not pick up on the advertising. We will assume the worse and assume that doesn't work. |
| Wannabe primary | Timeout | Recover primary | | The candidate state times out. The old primary now tries to page the phone, moving to low duty cycle initiating. |
| | Connect Phone | | | The old primary connects to the phone, but still hasn't reconnected to the secondary. |
| Acting primary | | Recover primary | | The acting primary is now working as expected for the user, and it is doing low duty cycle advertising to allow it to reconnect to the secondary when it comes back in range. |
| Connected | Connect PS (as primary) | secondary primary | Connect PS (as secondary) | Eventually the primary and phone come back into range of the old secondary. They connect over LE and then move to BR/EDR with their old roles. |

TABLE 17

State Path-Phone And Secondary Walk Away From Primary (Recover 2)

| Device A | Trigger on A | Device B | Trigger on B | Example Description |
|---|---|---|---|---|
| Idle | | Recover primary | | In the previous scenarios, we fell back to the case where the old primary is idle, and the old secondary is in the recover primary state. The old primary is now idle, waiting for user interaction. The old secondary is passively looking for a its primary by doing low duty cycle initiating. |
| Idle | | Candidate | User Interaction | The other scenario, compared with the case above, has the user press a button the old secondary. This places the old secondary device in the candidate state, doing low duty cycle advertising and high duty cycle initiating. The old |

TABLE 17-continued

State Path-Phone And Secondary Walk Away From Primary (Recover 2)

| Device A | Trigger on A | Device B | Trigger on B | Example Description |
|---|---|---|---|---|
| Idle | | Wannabe primary | Timeout | primary device is idle and is not advertising or scanning. The candidate state times out. The old secondary now tries to page the phone, moving to low duty cycle initiating. |
| Idle | | Acting primary | Connect Phone | The old secondary connects to the phone. The old secondary now acting primary is working as expected for the user, and it is doing low duty cycle advertising to allow it to reconnect to the secondary when it comes back in range. |
| | App logic | | | The app logic on the old primary decides to move into the recover primary state for a short period of time. |
| Recover primary | | Acting primary | | The old primary is now doing a low duty cycle initiating. The acting primary, doing low duty cycle advertising should eventually reconnect. |
| | Connect PS (as secondary) | | Connect (as primary) | PS Eventually the devices reconnect over LE. They then move to BR/EDR with their new roles. |
| secondary | | Connected primary | | |

TABLE 18

State Path-Phone And Secondary Walk Away From Primary (Recover 3)

| Device A | Trigger on A | Device B | Trigger on B | Example Description |
|---|---|---|---|---|
| | | | | In the previous scenarios, we fell back to the case where the old primary is idle, and the old secondary is in the recover primary state. |
| Idle | | Recover primary | | The old primary is now idle, waiting for user interaction. The old secondary is passively looking for a its primary by doing low duty cycle initiating. |
| | | | User Interaction | The other scenarios, the user pressed a button on one of the devices. This time the user will interact with both of them at one at a time. |
| | | | User Interaction | The other scenario, compared with the case above, has the user press a button the old secondary. |
| Idle | | Candidate | | This places the old secondary device in the candidate state, doing low duty cycle advertising and high duty cycle initiating. The old primary device is idle and is not advertising or scanning. |
| | | | Timeout | The candidate state times out. |
| Idle | | Wannabe primary | | The old secondary now tries to page the phone, moving to low duty cycle initiating. |
| | | | Connect Phone | The old secondary connects to the phone. |
| Idle | | Acting primary | | The old secondary now acting primary is working as expected for the user, and it is |

TABLE 18-continued

State Path-Phone And Secondary Walk Away From Primary (Recover 3)

| Device A | Trigger on A | Device B | Trigger on B | Example Description |
|---|---|---|---|---|
| Candidate | User Interaction | Acting primary | | doing low duty cycle advertising to allow it to reconnect to the secondary when it comes back in range. The old primary how has the user interact with it. This time device A is doing high duty cycle initiating, which should pick up the low duty cycle advertising of the acting primary. |
| | Connect PS (as secondary) | | Connect (as primary) | PS Eventually the devices reconnect over LE. They then move to BR/EDR with their new roles. |
| secondary | | Connected primary | | |

Figure 7:
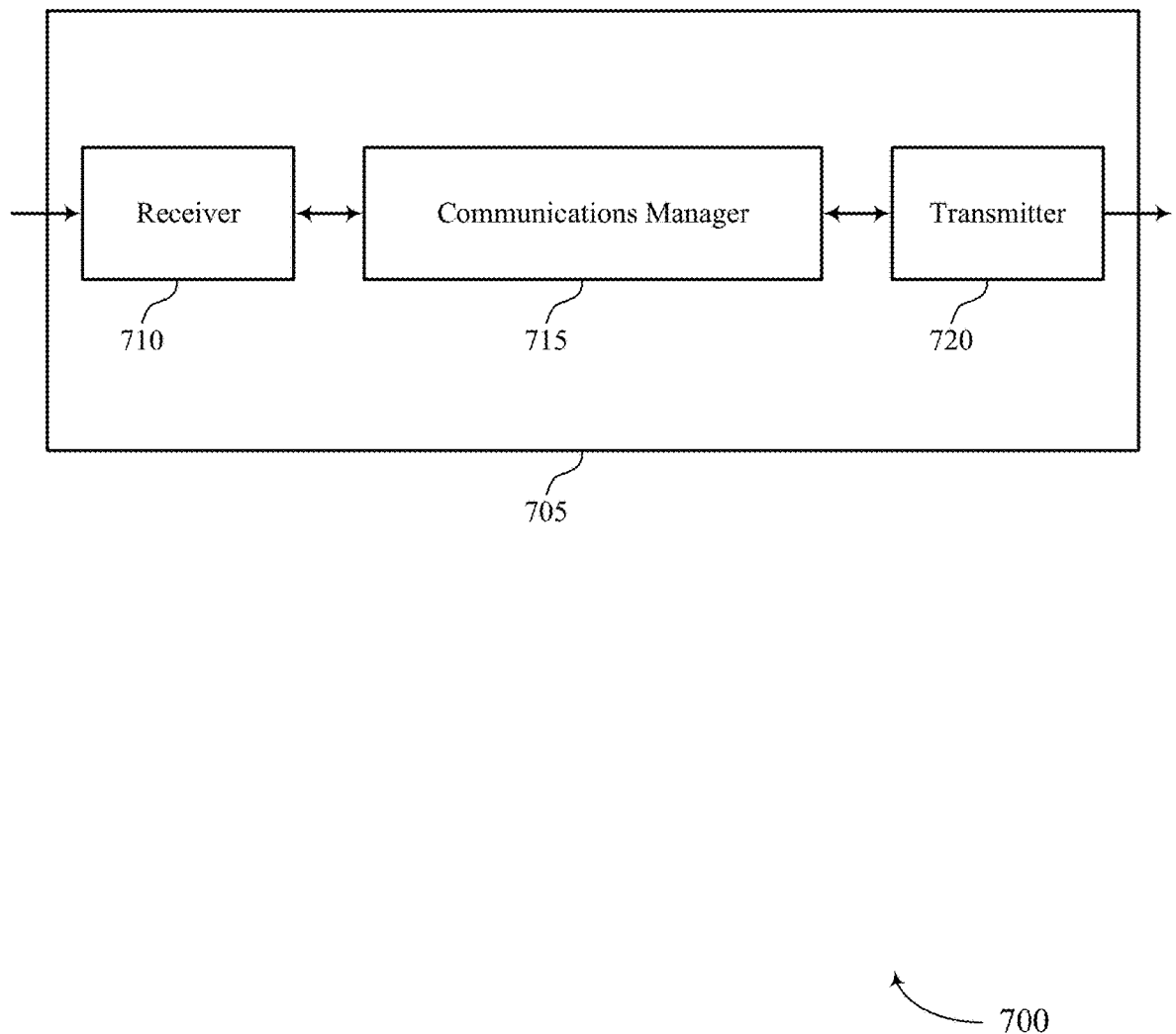
FIGS. 7 and 8 show block diagrams of devices that support address management for Bluetooth devices in accordance with aspects of the present disclosure.

FIG. 7 shows a block diagram 700 of a device 705 (e.g., a first device) that supports address management for Bluetooth devices in accordance with aspects of the present disclosure. The device 705 may be an example of aspects of a device as described herein (e.g., of a device 130 or, according to some aspects, a paired device 115). The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to address management for Bluetooth devices, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may exchange Bluetooth device address information with a second device (e.g., a second Bluetooth enabled device, such as a second earbud) based on a low energy connection between the first device (e.g., a first Bluetooth enabled device or first earbud, such as device 705) and the second device. The communications manager 715 may determine a role of the first device based on exchanging the Bluetooth device address information and identify a primary address associated with the first device or the second device based on the exchanged Bluetooth device address information and the role of the first device. The communications manager 715 may pair the first device with a third device (e.g., a source device or a phone) or shadow the second device based on the primary address (e.g., and based on the role of the first and second devices). The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
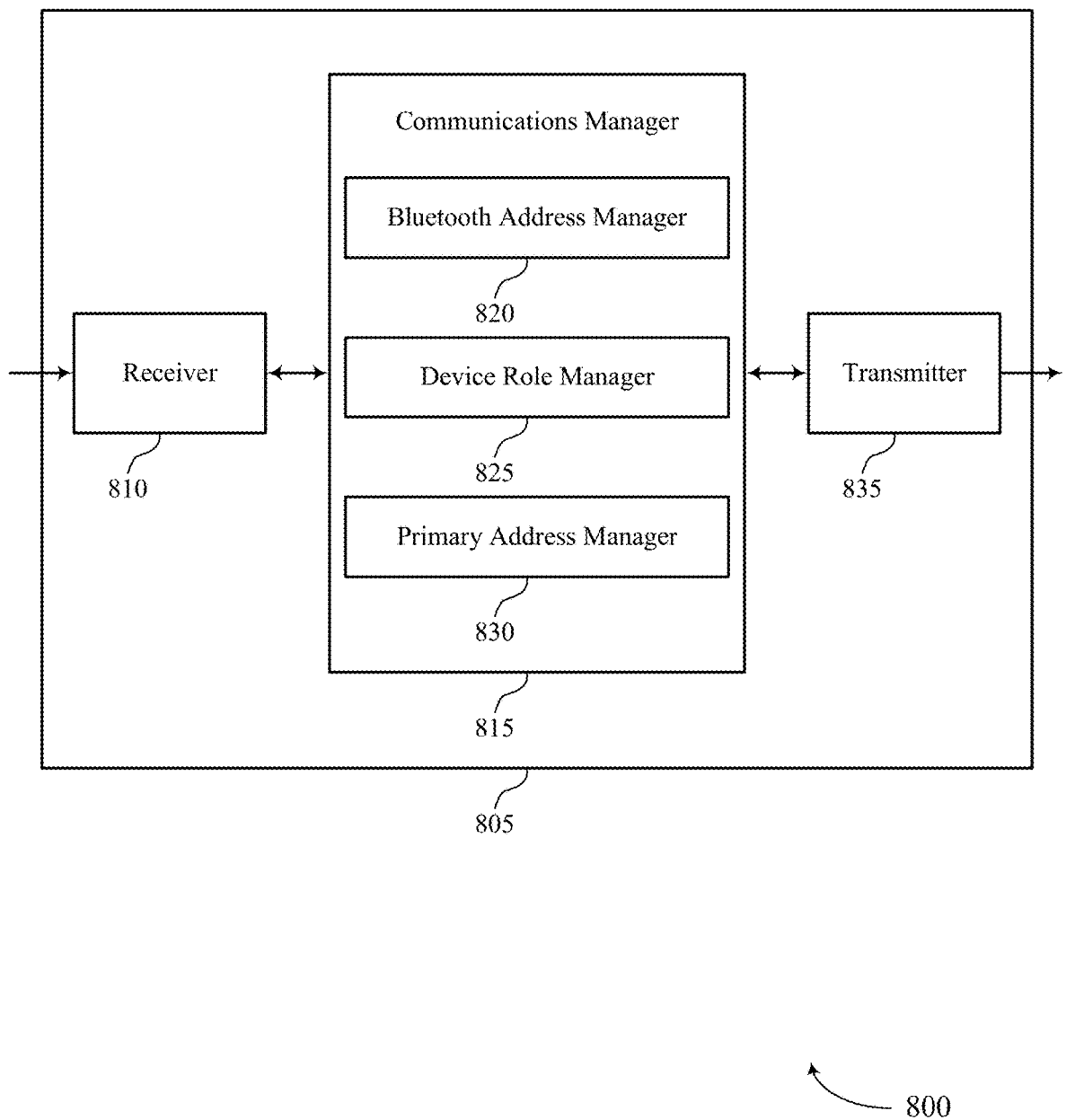

FIG. 8 shows a block diagram 800 of a device 805 (e.g., a first device) that supports address management for Bluetooth devices in accordance with aspects of the present disclosure. The device 805 may be an example of aspects of a device 705 or a device 130 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to address management for Bluetooth devices, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a Bluetooth address manager 820, a device role manager 825, and a primary address manager 830. The communications manager 815 may be an example of aspects of the communications manager 1010 described herein.

The Bluetooth address manager 820 may exchange Bluetooth device address information with a second device based on a low energy connection between the first device and the second device. The device role manager 825 may determine a role of the first device based on exchanging the Bluetooth device address information. The primary address manager 830 may identify a primary address associated with the first device or the second device based on the exchanged Bluetooth device address information and the role of the first device. The device role manager 825 may pair the first device with a third device or shadow the second device based on the primary address. For example, if the device role manager 825 determines the role of the first device is a primary role, the device role manager 825 may pair the first device with a third device (e.g., a phone) based on the primary address. If the device role manager 825 determines the role of the first device is a secondary role, the device role manager 825 may shadow the second device (e.g., the other device operating in the primary role) based on the primary address.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
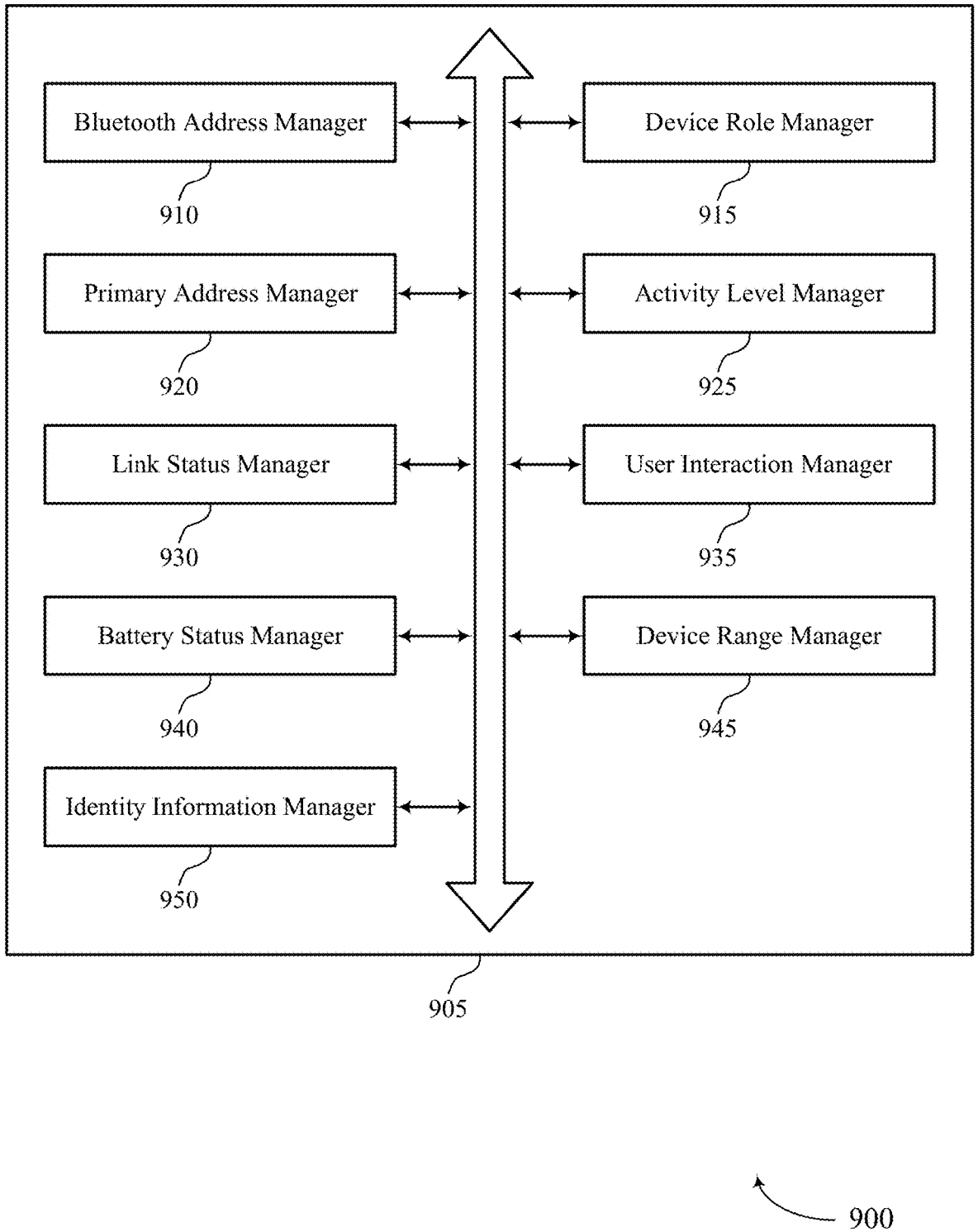
FIG. 9 shows a block diagram of a communications manager that supports address management for Bluetooth devices in accordance with aspects of the present disclosure.

FIG. 9 shows a block diagram 900 of a communications manager 905 that supports address management for Bluetooth devices in accordance with aspects of the present disclosure. The communications manager 905 may be an example of aspects of a communications manager 715, a communications manager 815, or a communications manager 1010 described herein. The communications manager 905 may include a Bluetooth address manager 910, a device role manager 915, a primary address manager 920, an activity level manager 925, a link status manager 930, an user interaction manager 935, a battery status manager 940, a device range manager 945, and an identity information manager 950. Each of these modules may communicate, directly or indirectly, with one another (e.g., via one or more buses).

The Bluetooth address manager 910 may exchange Bluetooth device address information with a second device (e.g., a second Bluetooth enabled device, such as a second earbud) based on a low energy connection between the first device (e.g., a first Bluetooth enabled device or first earbud, such as device including the communications manager 905) and the second device. The device role manager 915 may determine a role of the first device based on exchanging the Bluetooth device address information. The primary address manager 920 may identify a primary address associated with the first device or the second device based on the exchanged Bluetooth device address information and the role of the first device. In some examples, the device role manager 915 may pair the first device with a third device (e.g., a source device or a phone) or shadow the second device based on the primary address. In some examples, the device role manager 915 may pair the first device with the third device or shadow the second device based on the role of the first device.

In some examples, the device role manager 915 may determine a second role of the first device subsequent to the pairing of the first device with the third device or the shadowing of the second device. In some examples, the device role manager 915 may pair the first device with the third device or shadow the second device based on the primary address and the second role of the first device, the role of the first device different than the second role of the first device.

In some examples, the device role manager 915 may determine a previous role of the first device, a previous role of the second device, or both, where the role of the first device is determined based on the previous role of the first device, the previous role of the second device, or both. The activity level manager 925 may determine an activity level of the first device, an activity level of the second device, or both, where the role of the first device is determined based on the activity level of the first device, the activity level of the second device, or both. The link status manager 930 may determine a link status between the first device and the third device, a link status between the second device and the third device, or both, where the role of the first device is determined based on the link status between the first device and the third device, the link status between the second device and the third device, or both. The user interaction manager 935 may identify a user input selection of the first device, a user input selection of the second device, or both, where the role of the first device is determined based on the user input selection of the first device, the user input selection of the second device, or both. The battery status manager 940 may determine a battery status of the first device, a battery status of the second device, or both, where the role of the first device is determined based on the battery status of the first device, the battery status of the second device, or both. The device range manager 945 may identify a range between the first device and the third device, a range between the second device and the third device, or both, where the role of the first device is determined based on the range between the first device and the third device, the range between the second device and the third device, or both.

In some cases, the role of the first device includes a primary role and the primary address is identified based on a Bluetooth address of the first device. The identity information manager 950 may transmit, to the third device, identity information based on the primary address, where the identity information includes the primary address. In some examples, the identity information manager 950 may transmit, to the second device, a Bluetooth address of the third device, a link key to be used on a connection with the third device, an identity resolving key of the third device, a device root key of the first device, a long term key to be used on the connection with the third device, information to generate the long term key to be used on the connection with the third device, or any combination thereof.

In some cases, the role of the first device includes a secondary role and the primary address is identified based on a Bluetooth address of the second device. In some examples, the identity information manager 950 may receive, from the second device, a Bluetooth address of the third device, a link key to be used on a connection with the third device, an identity resolving key of the third device, a device root key of the first device, a long term key to be used on the connection with the third device, information to generate the long term key to be used on the connection with the third device, or any combination thereof. In some examples, determining a second role of the first device based on a status of the first device, where the second role of the first device includes a primary role. In some examples, the device role manager 915 may pair the first device with the third device based on the primary address and the Bluetooth address of the third device.

Figure 10:
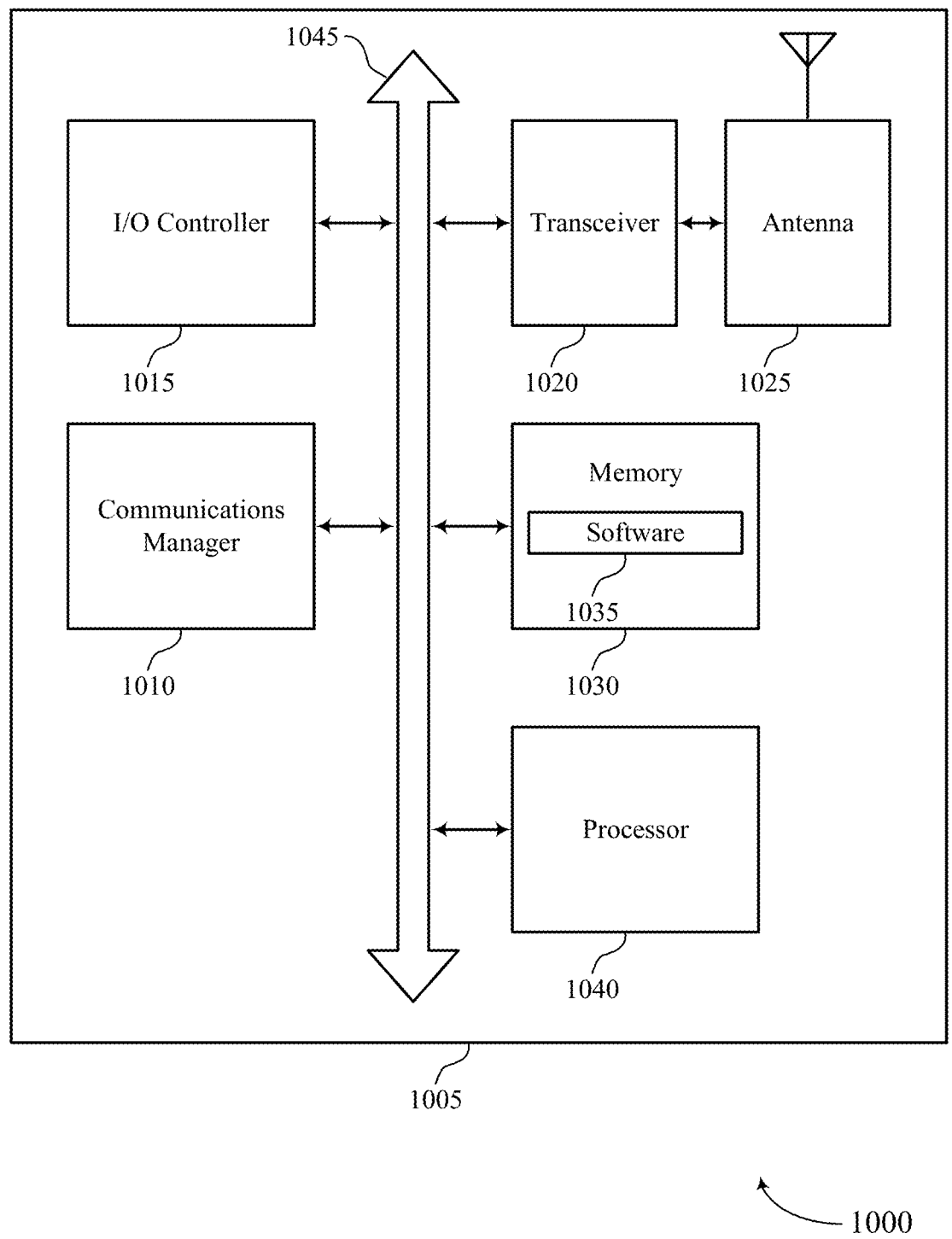
FIG. 10 shows a diagram of a system including a device that supports address management for Bluetooth devices in accordance with aspects of the present disclosure.

FIG. 10 shows a diagram of a system 1000 including a device 1005 that supports address management for Bluetooth devices in accordance with aspects of the present disclosure. The device 1005 may be an example of or include the components of device 705, device 805, or a device as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may exchange Bluetooth device address information with a second device based on a low energy connection between the first device and the second device, determine a role of the first device based on exchanging the Bluetooth device address information, pair the first device with a third device or shadow the second device based on the primary address, and identify a primary address associated with the first device or the second device based on the exchanged Bluetooth device address information and the role of the first device.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code or software 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting address management for Bluetooth devices).

The software 1035 may include instructions to implement aspects of the present disclosure, including instructions to support wireless communications. The software 1035 may be stored in a non-transitory computer-readable medium such as system memory or other type of memory. In some cases, the software 1035 may not be directly executable by the processor 1040 but may cause a computer (e.g., when compiled and executed) to perform functions described herein.

Figure 11:
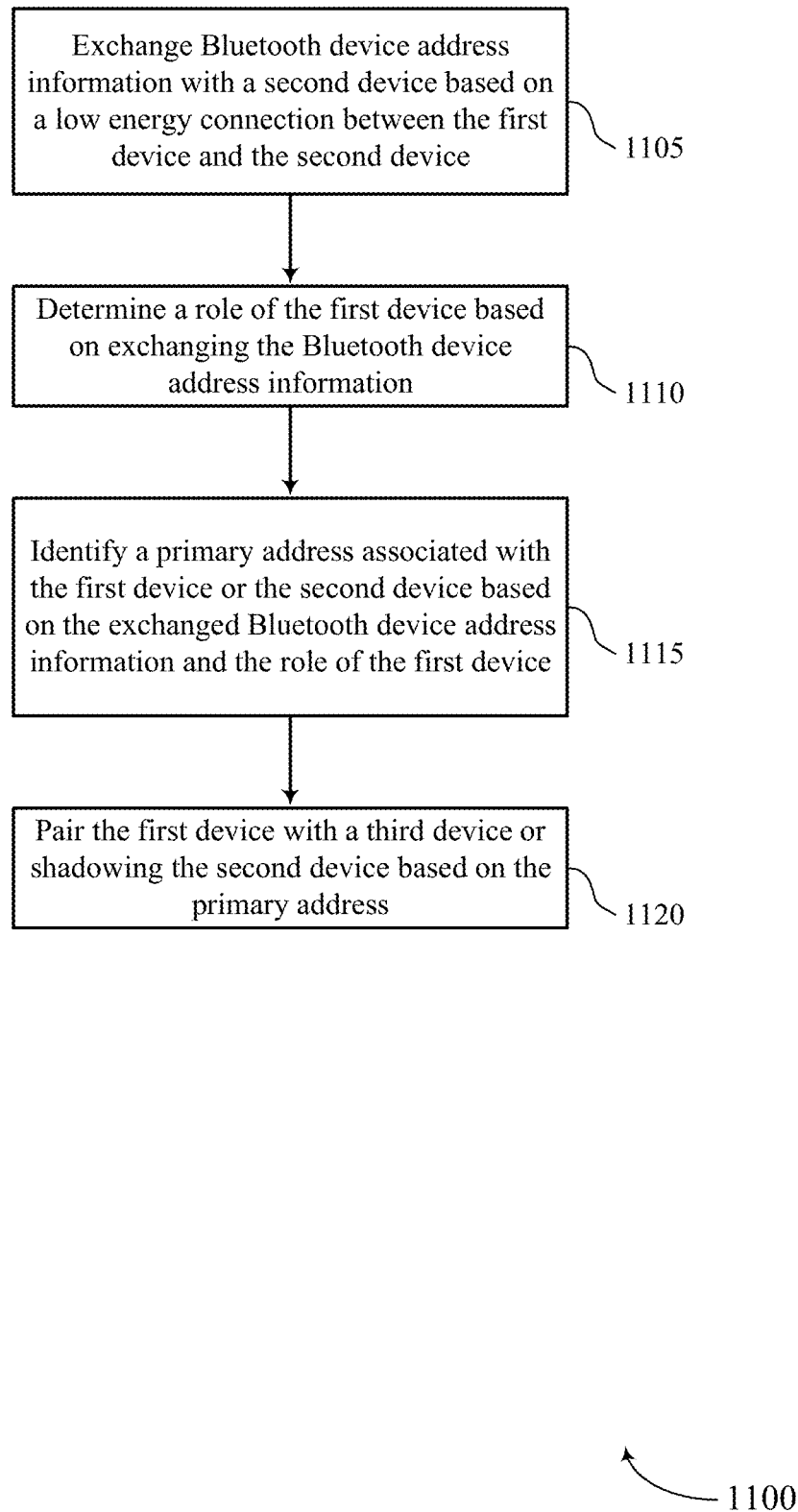
FIGS. 11 and 12 show flowcharts illustrating methods that support address management for Bluetooth devices in accordance with aspects of the present disclosure.

FIG. 11 shows a flowchart illustrating a method 1100 that supports address management for Bluetooth devices in accordance with aspects of the present disclosure. The operations of method 1100 may be implemented by a device or its components as described herein. For example, the operations of method 1100 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1105, the device may exchange Bluetooth device address information with a second device based on a low energy connection between the first device and the second device. The operations of 1105 may be performed according to the methods described herein. In some examples, aspects of the operations of 1105 may be performed by a Bluetooth address manager as described with reference to FIGS. 7 through 10.

At 1110, the device may determine a role of the first device based on exchanging the Bluetooth device address information. The operations of 1110 may be performed according to the methods described herein. In some examples, aspects of the operations of 1110 may be performed by a device role manager as described with reference to FIGS. 7 through 10.

At 1115, the device may identify a primary address associated with the first device or the second device based on the exchanged Bluetooth device address information and the role of the first device. The operations of 1115 may be performed according to the methods described herein. In some examples, aspects of the operations of 1115 may be performed by a primary address manager as described with reference to FIGS. 7 through 10.

At 1120, the device may pair the first device with a third device or shadow the second device based on the primary address. The operations of 1120 may be performed according to the methods described herein. In some examples, aspects of the operations of 1120 may be performed by a device role manager as described with reference to FIGS. 7 through 10.

Figure 12:
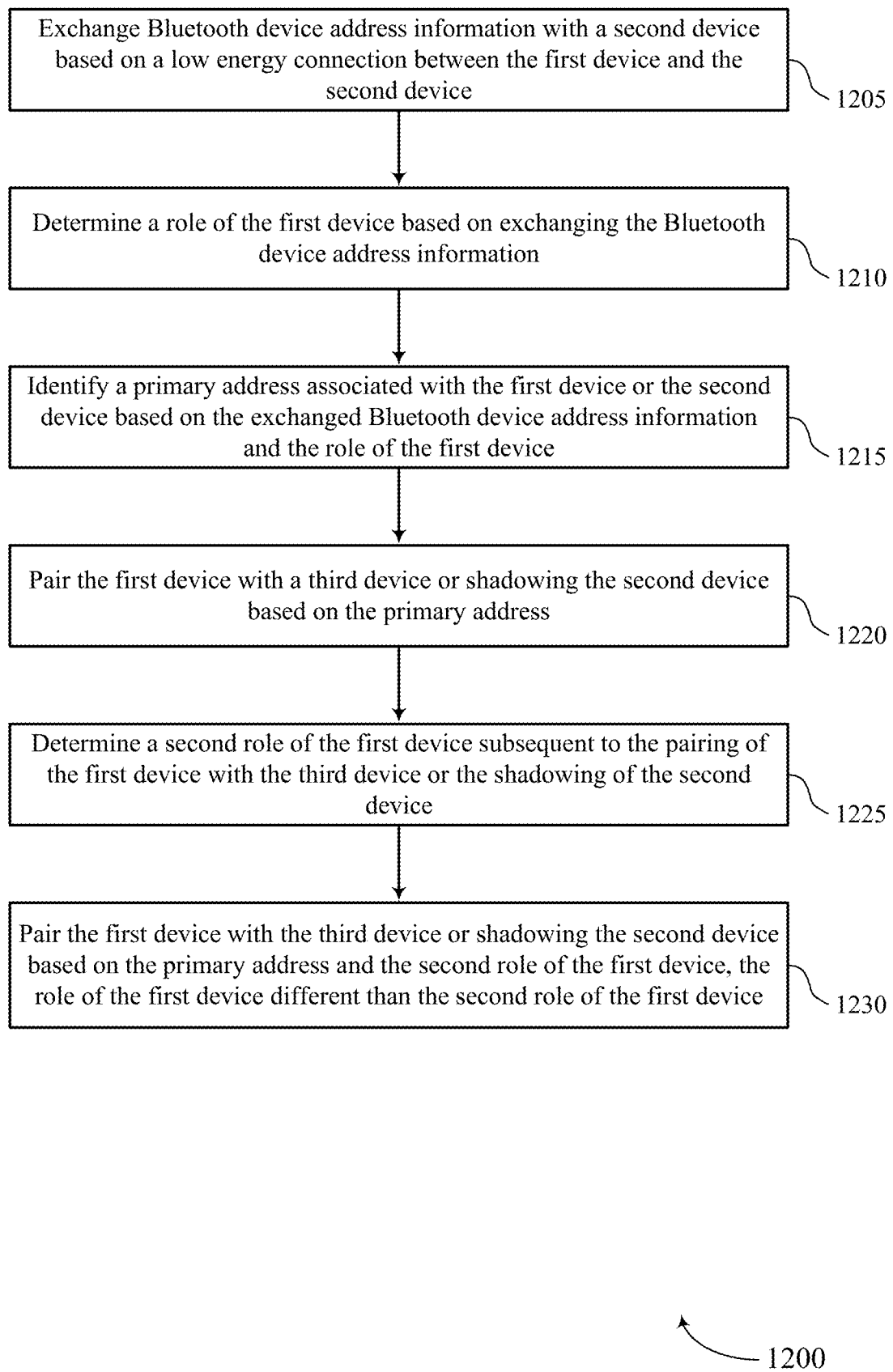

FIG. 12 shows a flowchart illustrating a method 1200 that supports address management for Bluetooth devices in accordance with aspects of the present disclosure. The operations of method 1200 may be implemented by a device or its components as described herein. For example, the operations of method 1200 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1205, the device may exchange Bluetooth device address information with a second device based on a low energy connection between the first device and the second device. The operations of 1205 may be performed according to the methods described herein. In some examples, aspects of the operations of 1205 may be performed by a Bluetooth address manager as described with reference to FIGS. 7 through 10.

At 1210, the device may determine a role of the first device based on exchanging the Bluetooth device address information. The operations of 1210 may be performed according to the methods described herein. In some examples, aspects of the operations of 1210 may be performed by a device role manager as described with reference to FIGS. 7 through 10.

At 1215, the device may identify a primary address associated with the first device or the second device based on the exchanged Bluetooth device address information and the role of the first device. The operations of 1215 may be performed according to the methods described herein. In some examples, aspects of the operations of 1215 may be performed by a primary address manager as described with reference to FIGS. 7 through 10.

At 1220, the device may pair the first device with a third device or shadow the second device based on the primary address. The operations of 1220 may be performed according to the methods described herein. In some examples, aspects of the operations of 1220 may be performed by a device role manager as described with reference to FIGS. 7 through 10.

At 1225, the device may determine a second role of the first device subsequent to the pairing of the first device with the third device or the shadowing of the second device. The operations of 1225 may be performed according to the methods described herein. In some examples, aspects of the operations of 1225 may be performed by a device role manager as described with reference to FIGS. 7 through 10.

At 1230, the device may pair the first device with the third device or shadow the second device based on the primary address and the second role of the first device, the role of the first device different than the second role of the first device. The operations of 1230 may be performed according to the methods described herein. In some examples, aspects of the operations of 1230 may be performed by a device role manager as described with reference to FIGS. 7 through 10.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:
   exchanging Bluetooth device address information with a second device based at least in part on a low energy connection between the first device and the second device;
   determining, amongst the first device and the second device, a role of the first device based at least in part on exchanging the Bluetooth device address information and a quality condition of the first device relative to a quality condition of the second device, wherein the role of the first device comprises a secondary role for communication with a source device in accordance with a first instance of the quality condition of the first device relative to a first instance of the quality condition of the second device;
   identifying a primary address associated with the second device based at least in part on the exchanged Bluetooth device address information and the role of the first device comprising the secondary role;
   receiving source device connection information from the second device; and
   pairing the first device with the source device based at least in part on the primary address of the secondary device and the source device connection information received from the second device.

2. The method of claim 1, further comprising:
   determining, amongst the first device and the second device, a second role of the first device subsequent to the pairing of the first device with the source device; and
   pairing the first device with the source device based at least in part on the primary address and the second role of the first device, the role of the first device different than the second role of the first device.

3. The method of claim 1, further comprising:
   determining an activity level of the first device, an activity level of the second device, or both, wherein the activity level comprises a call status of the source device, and wherein the role of the first device is determined based at least in part on the activity level of the first device, the activity level of the second device, or both.

4. The method of claim 1, further comprising:
   determining a link status between the first device and the source device, a link status between the second device and the source device, or both, wherein the role of the first device is determined based at least in part on the link status between the first device and the source device, the link status between the second device and the source device, or both.

5. The method of claim 1, further comprising:
   identifying a user input selection of the first device, a user input selection of the second device, or both, wherein the role of the first device is determined based at least in part on the user input selection of the first device, the user input selection of the second device, or both.

6. The method of claim 1, further comprising:
   determining a battery status of the first device, a battery status of the second device, or both, wherein the role of the first device is determined based at least in part on the battery status of the first device, the battery status of the second device, or both.

7. The method of claim 1, further comprising:
determining a previous role of the first device, a previous role of the second device, or both, wherein the role of the first device is determined based at least in part on the previous role of the first device, the previous role of the second device, or both.

8. The method of claim 1, further comprising:
identifying a range between the first device and the source device, a range between the second device and the source device, or both, wherein the role of the first device is determined based at least in part on the range between the first device and the source device, the range between the second device and the source device, or both.

9. The method of claim 1, wherein the role of the first device comprises a primary role and the primary address is identified based at least in part on a Bluetooth address of the second device.

10. The method of claim 9, further comprising:
transmitting, to the source device, identity information based at least in part on the primary address, wherein the identity information comprises the primary address.

11. The method of claim 9, wherein the source device connection information comprises
a Bluetooth address of the source device, a link key to be used on a connection with the source device, an identity resolving key of the source device, a device root key of the first device, a long term key to be used on a connection with the source device, information to generate the long term key to be used on the connection with the source device, or any combination thereof.

12. The method of claim 1, wherein the role of the first device comprises the secondary role and the primary address is identified based at least in part on a Bluetooth address of the second device.

13. The method of claim 1, further comprising:
determining, amongst the first device and the second device, a second role of the first device based at least in part on a status of the first device, wherein the second role of the first device comprises pairing the first device with a third device; and
pairing the first device with the third device based at least in part on the primary address and the second role of the first device.

14. The method of claim 1, wherein the quality condition of the first device or the quality condition of the second device, or both, comprise a threshold decibel value, or a signal quality, or a signal strength, or a microphone quality, or a battery level, or a relative distance to the source device, or any combination thereof.

15. The method of claim 1, further comprising:
switching roles with the second device based at least in part on a second instance of the quality condition of the first device relative to a second instance of the quality condition of the second device, wherein the switching roles comprises the second device switching to the secondary role for communication with the source device and the first device switching to a primary role for communication with a source device; and
using, while in the primary role, the primary address of the secondary device and the source device connection information received from the second device to communicate with the source device.

16. An apparatus for wireless communication at a first device, comprising:
a processor,
memory in electronic communication with the processor; and
instructions stored in the memory and executable by the processor to cause the apparatus to:
exchange Bluetooth device address information with a second device based at least in part on a low energy connection between the first device and the second device;
determine, amongst the first device and the second device, a role of the first device based at least in part on exchanging the Bluetooth device address information and a quality condition of the first device relative to a quality condition of the second device, wherein the role of the first device comprises a secondary role for communication with a source device in accordance with a first instance of the quality condition of the first device relative to a first instance of the quality condition of the second device;
identify a primary address associated with the second device based at least in part on the exchanged Bluetooth device address information and the role of the first device comprising the secondary role;
receive source device connection information from the second device; and
pair the first device with the source device based at least in part on the primary address of the secondary device and the source device connection information received from the second device.

17. The apparatus of claim 16, wherein the instructions are further executable by the processor to cause the apparatus to:
determine, amongst the first device and the second device, a second role of the first device subsequent to the pairing of the first device with the source device or the shadowing of the second device; and
pair the first device with the source device or shadow the second device based at least in part on the primary address and the second role of the first device, the role of the first device different than the second role of the first device.

18. The apparatus of claim 16, wherein the instructions are further executable by the processor to cause the apparatus to:
determine an activity level of the first device, an activity level of the second device, or both, wherein the activity level comprises a call status of the source device, and wherein the role of the first device is determined based at least in part on the activity level of the first device, the activity level of the second device, or both.

19. The apparatus of claim 16, wherein the instructions are further executable by the processor to cause the apparatus to:
determine a link status between the first device and the source device, a link status between the second device and the source device, or both, wherein the role of the first device is determined based at least in part on the link status between the first device and the source device, the link status between the second device and the source device, or both.

20. An apparatus for wireless communication at a first device, comprising:
means for exchanging Bluetooth device address information with a second device based at least in part on a low energy connection between the first device and the second device;

means for determining, amongst the first device and the second device, a role of the first device based at least in part on exchanging the Bluetooth device address information and a quality condition of the first device relative to a quality condition of the second device, wherein the role of the first device comprises a secondary role for communication with a source device in accordance with a first instance of the quality condition of the first device relative to a first instance of the quality condition of the second device;

means for identifying a primary address associated with the second device based at least in part on the exchanged Bluetooth device address information and the role of the first device comprising the secondary role;

means for receiving source device connection information from the second device; and means for pairing the first device with the source device based at least in part on the primary address of the secondary device and the source device connection information received from the second device.

* * * * *